(12) United States Patent
Asahara et al.

(10) Patent No.: US 8,594,870 B2
(45) Date of Patent: Nov. 26, 2013

(54) OPERATING NOISE CONTROL DEVICE AND OPERATING NOISE CONTROL METHOD FOR VEHICLE

(75) Inventors: Yasuyuki Asahara, Yokohama (JP); Takeshi Toi, Tokyo (JP); Kazuki Yokoyama, Tokyo (JP)

(73) Assignees: Nissan Motor Co., Ltd., Yokohama-shi (JP); Chuo University, Tokyo (JP)

( * ) Notice: Subject to any disclaimer, the term of this patent is extended or adjusted under 35 U.S.C. 154(b) by 448 days.

(21) Appl. No.: 13/060,401

(22) PCT Filed: Aug. 28, 2008

(86) PCT No.: PCT/JP2008/065918
§ 371 (c)(1), (2), (4) Date: Feb. 23, 2011

(87) PCT Pub. No.: WO2010/023768
PCT Pub. Date: Mar. 4, 2010

(65) Prior Publication Data
US 2011/0153133 A1   Jun. 23, 2011

(51) Int. Cl.
*B60L 11/18* (2006.01)
(52) U.S. Cl.
USPC .......................................................... 701/22
(58) Field of Classification Search
None
See application file for complete search history.

(56) References Cited

U.S. PATENT DOCUMENTS

| | | | | |
|---|---|---|---|---|
| 4,403,350 A * | 9/1983 | Imai et al. | ..................... | 455/297 |
| 4,965,504 A | 10/1990 | Ueda et al. | | |
| 5,386,372 A * | 1/1995 | Kobayashi et al. | ........... | 700/280 |
| 5,939,625 A * | 8/1999 | Torii et al. | ................... | 73/117.01 |
| 7,158,840 B2 * | 1/2007 | Jacques | ........................... | 700/28 |
| 7,562,904 B2 * | 7/2009 | Gustavsson | .................... | 280/779 |
| 7,747,353 B2 * | 6/2010 | Mizushima et al. | .......... | 700/280 |
| 7,904,212 B2 * | 3/2011 | Mensler et al. | .................... | 701/1 |
| 8,111,834 B2 * | 2/2012 | Kobayashi et al. | .......... | 381/71.4 |
| 2005/0200462 A1 | 9/2005 | Maekawa et al. | | |
| 2007/0117529 A1 * | 5/2007 | Oe | ................................ | 455/296 |

FOREIGN PATENT DOCUMENTS

| | | |
|---|---|---|
| EP | 1067669 B1 | 2/2004 |
| JP | 2-179297 A | 7/1990 |
| JP | 7-177601 A | 7/1995 |
| JP | 7-205753 A | 8/1995 |
| JP | 10-83187 A | 3/1998 |
| JP | 2001-25258 A | 1/2001 |
| JP | 2001-282263 A | 10/2001 |
| JP | 2004-136831 A | 5/2004 |
| JP | 2005-278281 A | 10/2005 |

OTHER PUBLICATIONS

Seichiro Nanba et al., Method of Psychological Measurement for Sound Evaluation, ISBN: 978-4-339-01104-3, Jul. 15, 1998, pp. 106-133, Corona.

* cited by examiner

*Primary Examiner* — Thomas Tarcza
*Assistant Examiner* — Alex C Dunn
(74) *Attorney, Agent, or Firm* — Foley & Lardner LLP

(57) ABSTRACT

A vehicle (1, 17) includes an electric drive motor (5, 19), an inverter (4) that provides a drive current to the electric motor (5, 19) and a controller (13) that controls the inverter (4). The controller (13) functions as a beat noise generation system that creates beat noise by generating a second operating noise containing a component an order of which is very close to a value representing an order of an operating noise generated in proportion to a rotation speed of the electric motor (5, 19) so as to create desirable traveling noise corresponding to an accelerating state while the vehicle accelerates.

23 Claims, 28 Drawing Sheets

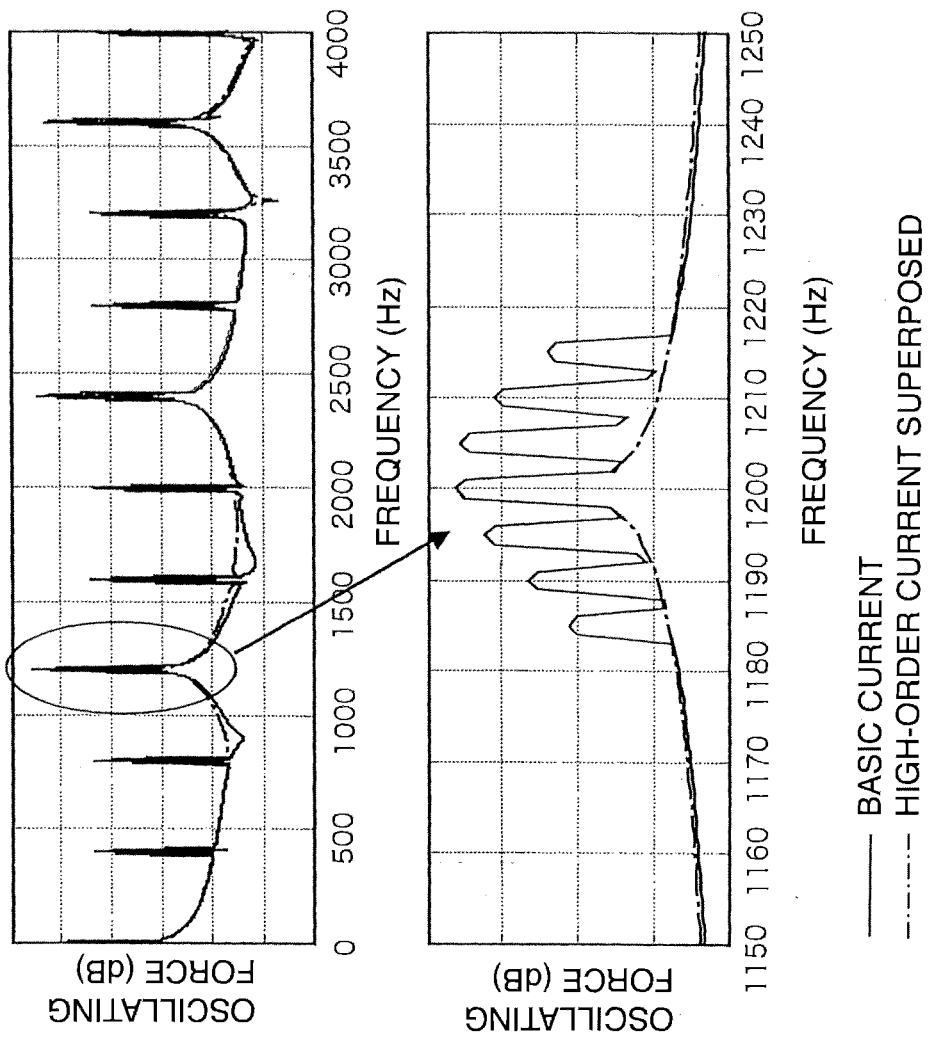

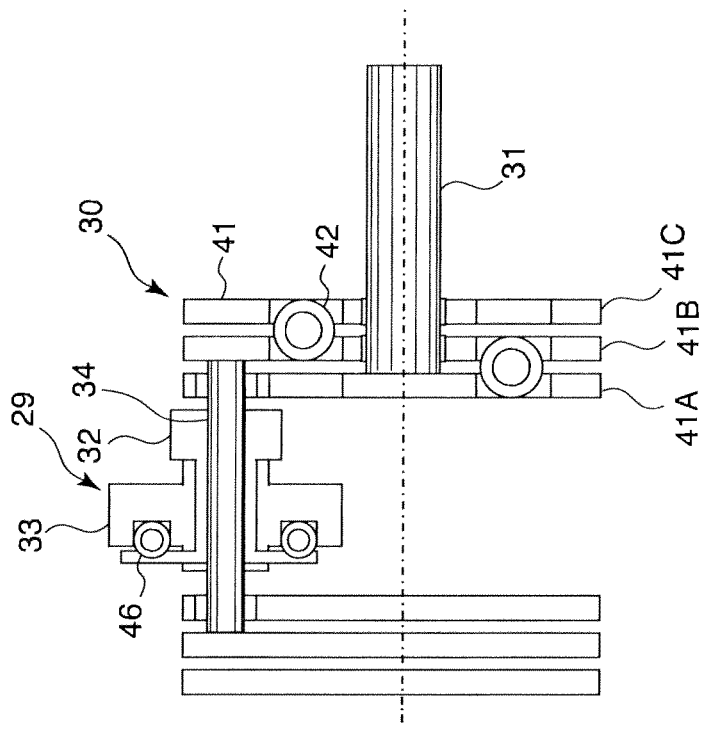
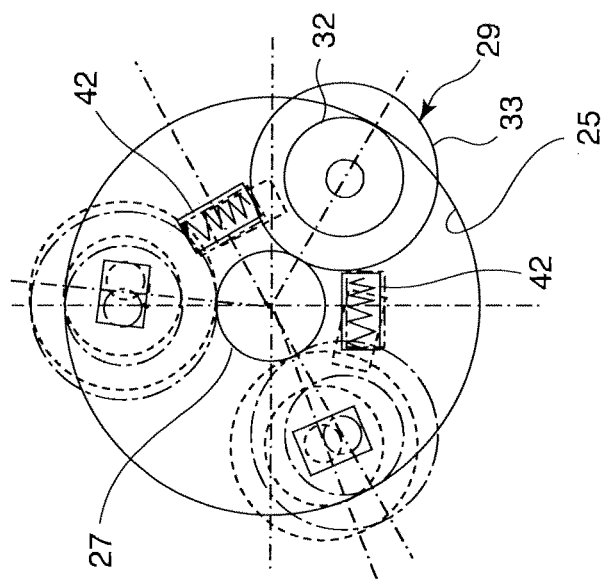
FIG. 20B
FIG. 20A

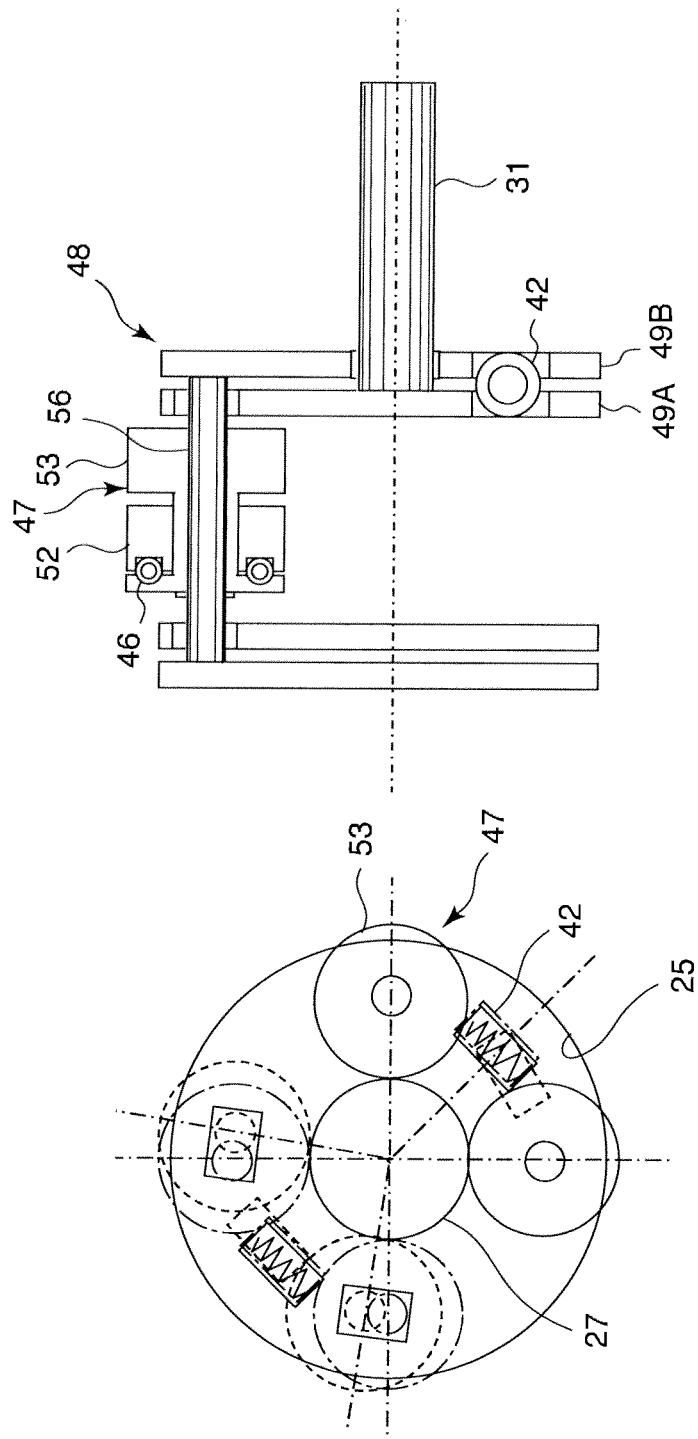

OPERATING NOISE CONTROL DEVICE AND OPERATING NOISE CONTROL METHOD FOR VEHICLE

FIELD OF THE INVENTION

This invention relates to control of motive power noise in a vehicle.

BACKGROUND OF THE INVENTION

JP2008-37133A published by the Japan Patent Office in the year 2008 proposes a beat noise preventing device that prevents beat noise in an electric vehicle that includes drive wheels each driven with an in-wheel motor equipped with an electric motor and a reduction gear.

Beat noise occurs as operating noises originating from a plurality of in-wheel motors become superposed. Such beat noise is suppressed in the prior art by adjusting the frequency of the operating noise at the electric motor or the reduction gear in each wheel.

SUMMARY OF THE INVENTION

Assuring quiet operation has been generally considered to be a primary goal for a vehicle that uses an electric motor as the motive power source. However, in certain situations the driver may not want sustained quiet operation.

The driver of a vehicle with an internal combustion engine used as a motive force source thereof accelerates the vehicle by stepping on the accelerator pedal and the sensation of acceleration of the vehicle is augmented by the engine noise as the operating noise of the internal combustion engine, responding to the depression of the accelerator pedal, winds up.

In a vehicle with an electric motor used as a motive force source thereof, on the other hand, the operating noise of the electric motor, unlike an internal combustion engine, does not change dramatically during acceleration.

It is therefore an object of this invention to achieve an improvement with regard to the operating noise occurring during acceleration of a vehicle that uses an electric motor as a motive force source.

In order to achieve the object described above, an operating noise control device according to this invention, which controls operating noise in the vehicle with an electric motor used as a motive power source, includes a beat noise generating system that creates beat noise during vehicle acceleration by generating operating noise containing a component, the order of which is very close to an operating noise generation order that is in proportion to a rotation speed of the electric motor.

An operating noise control method according to this invention, to be adopted in a vehicle that uses an electric motor as a motive power source, beat noise is created during vehicle acceleration by generating operating noise containing a component the order of which is very close to an order of operating noise generation that is in proportion to the rotation speed of the electric motor.

As such beat noise is created during vehicle acceleration, the driver of the accelerating vehicle is able to physically experience a sensation of acceleration in the form of the operating noise while quietness under steady traveling conditions is still assured.

The details as well as other features and advantages of this invention are set forth in the remainder of the specification and are shown in the accompanying drawings.

BRIEF DESCRIPTION OF THE DRAWINGS

FIGS. 3A and 3B are diagrams showing the principle of beat noise generation.

FIGS. 20A and 20B show an interlocking phase altering mechanism included in the operating noise control device according to the fourth embodiment of this invention, respectively in a schematic cross-sectional view and in a schematic longitudinal sectional view of the planetary gear unit.

FIGS. 26A and 26B show an interlocking phase altering mechanism included in the operating noise control device according to a sixth embodiment of this invention, respectively in a schematic cross-sectional view and in a schematic longitudinal sectional view of the planetary gear unit.

DESCRIPTION OF THE PREFERRED EMBODIMENTS

Referring to FIGS. 1 and 2, FIGS. 3A and 3B, FIGS. 4A-4C, FIG. 5, FIGS. 6A and 6B, FIGS. 7A and 7B, FIGS. 8A and 8B and FIG. 9 of the drawings, a first embodiment of this invention will be described.

Figure 1:
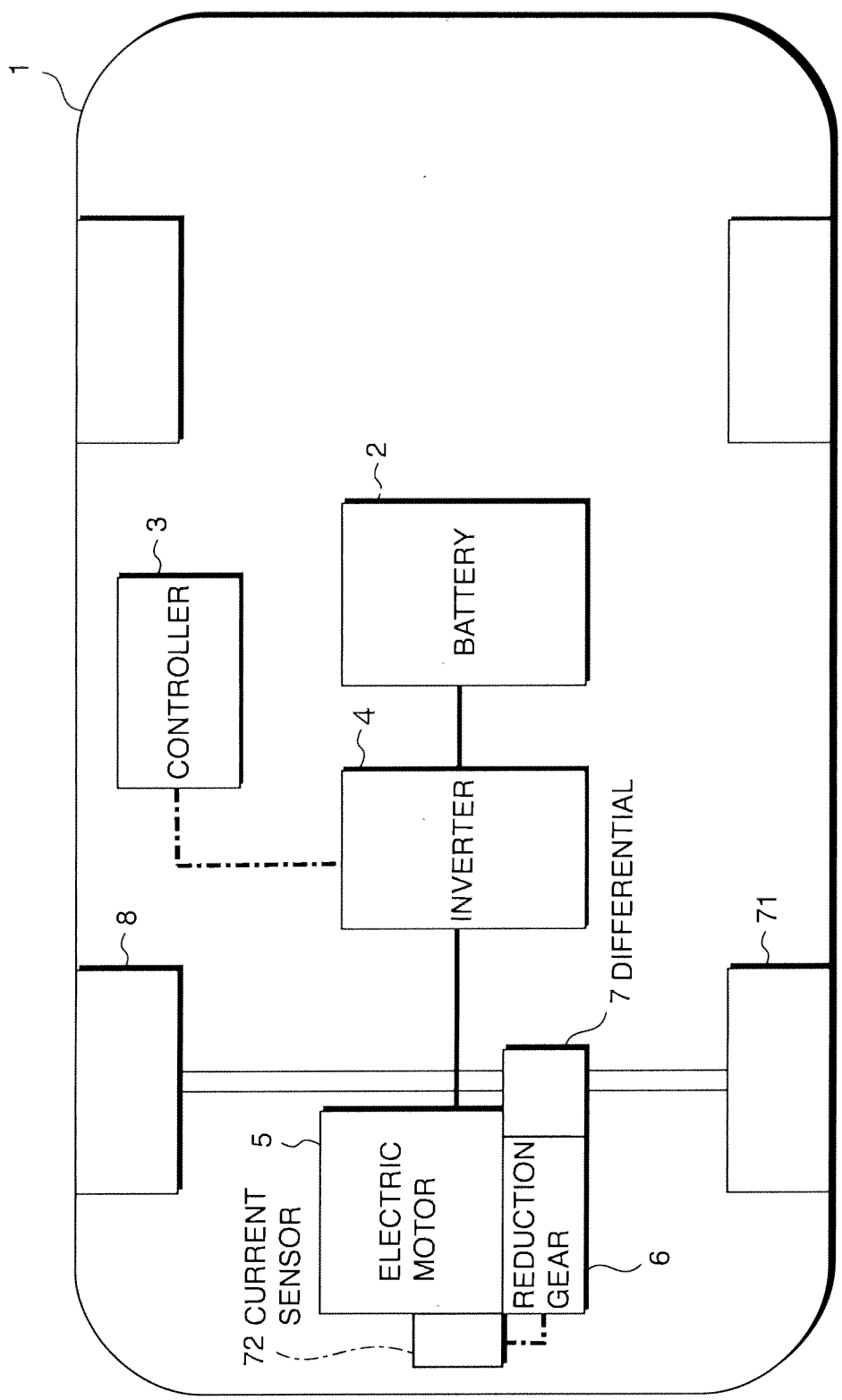
FIG. 1 is a schematic block diagram showing the structure adopted in an electric vehicle that includes an operating noise control device according to a first embodiment of this invention.

Referring to FIG. 1, a vehicle 1 equipped with an operating noise control device according to this invention travels as drive wheels are rotationally driven by an electric motor 5 with electric power supplied from a battery 2. Power is stored in the battery 2 in advance by supplying electric power from an external source.

DC power supplied from the battery 2 is first converted to three-phase AC power at an inverter 4 and thus is input as three-phase AC power to the electric motor 5. The electric motor 5 is constituted with a synchronous AC motor. The rotation of the electric motor 5 is transmitted to drive wheels 71 via a reduction gear 6 and a differential 7. The inverter 4 converts the electrical current based upon a command signal issued by a controller 3.

The controller 3 calculates drive current command values in correspondence to the present vehicle operating condition and executes current feedback control so as to ensure that specific three-phase AC power is output from the inverter 4 based upon comparison of actual current values detected by a current sensor 72, which detects the values of the actual currents flowing at the different phases, to the drive current command values.

The controller is constituted by a microcomputer comprising a central processing unit (CPU), a read-only memory (ROM), a random access memory (RAM), and an input/output interface (I/O interface). The controller may be constituted by a plurality of microcomputers.

When the vehicle is accelerating, it is normally assumed that the driver of the vehicle is actively seeking to increase speed. Accordingly, the subjective impression of vehicle handling during acceleration may be improved by ensuring that the operating noise of the electric motor 5 used as the motive force source, is altered to assume a tone invoking a sense of acceleration.

The initial operating noise that the electric motor 5 actually makes can be rendered less noticeable by deliberately generating an operating noise of the electric motor 5, as described above. This is likely to lead to another advantage in that an operating noise reducing member such as a noise insulation cover can be eliminated.

Figure 2:
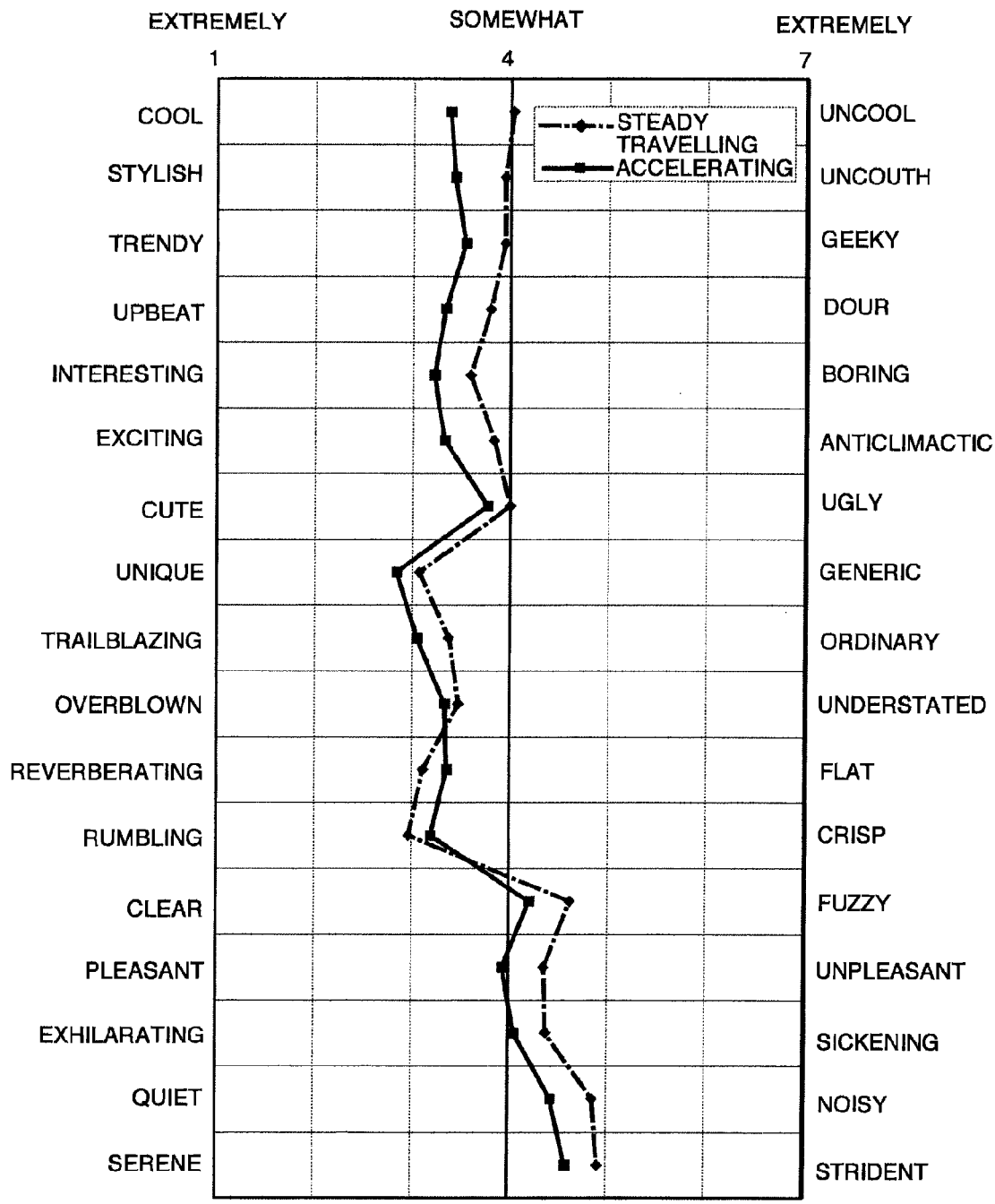
FIG. 2 is a diagram providing the results of an evaluation conducted by the inventors to gauge beat noise tonal quality on a beat noise tonal quality scale by adopting the semantic differential method (SD method) under steady traveling conditions and under vehicle accelerating conditions.

FIG. 2 provides the results of an evaluation conducted by the inventors to evaluate through the semantic differential method (SD method) the tonal quality of sounds created by adding beat noise to steady traveling noise and accelerating noise of an electric vehicle, as perceived by drivers, i.e., the subjects of the evaluation. Adoption of the SD method in tonal quality evaluation is described on pages 107-133 of "Method of Psychological Measurement for Sound Evaluation", by Seichiro Nanba and Sonoko Kuwano, published by Corona, ISBN: 978-4-339-01104-3.

In the figure, lower SD points, relative to the reference value of 4, equivalent to a response to traveling noise without any added beat noise, indicate more positive responses. For the steady traveling noise, beat noise generated with a constant beat frequency was added to an electric motor noise with a constant frequency. For the accelerating noise, beat noise was generated so that the beat frequency would increase as the vehicle accelerated and the electric motor rotation speed increased. The results in the figure indicate averages of the evaluation points measured by generating such beat noises under varying conditions.

An overall comparison of the steady traveling noise and the accelerating noise indicates that the addition of the beat noise to the accelerating noise more effectively improved the evaluation results. The subjects were obviously more likely to express their emotional response to the sound with terms such as "joyous", "fun", "exciting", "unique" and "trailblazing". In addition, the subjects listening to the accelerating noise did not find it "unpleasant", as they did while listening to the steady traveling noise. This means that generation of beat noise during acceleration of an electric vehicle can create a totally new, trailblazing and fun sense of acceleration.

While the vehicle is engaged in a steady traveling operation during which the driver is not likely to have the intent to maneuver the vehicle aggressively, on the other hand, the driver may find it unpleasant to be subjected to operating noise that includes beat noise as well as the electric motor noise with a constant frequency.

The operating noise control device includes a beat noise generation system that generates beat noise at the electric motor 5 when the vehicle is engaged in accelerating operation but does not generate any beat noise at the electric motor 5 when the vehicle is engaged in steady traveling operation. The beat noise generation system comprises the electric motor 5, the inverter 4, which supplies AC power to the electric motor 5 and the controller 3, which controls the voltage, frequency and waveform of the AC power.

Figure 4A:
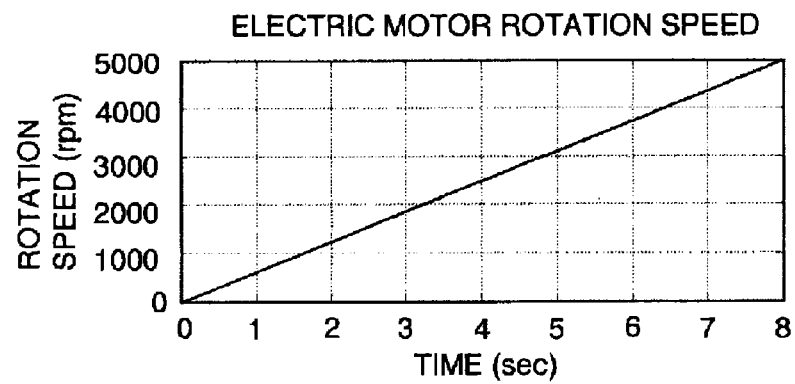
FIGS. 4A-4C are diagrams showing the characteristics of beat noise generated by the operating noise control device by superposing higher-order electrical currents.
Figure 4B:
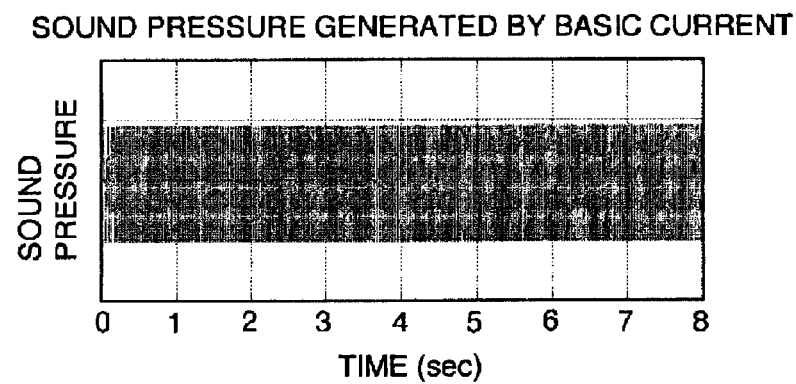
Figure 4C:
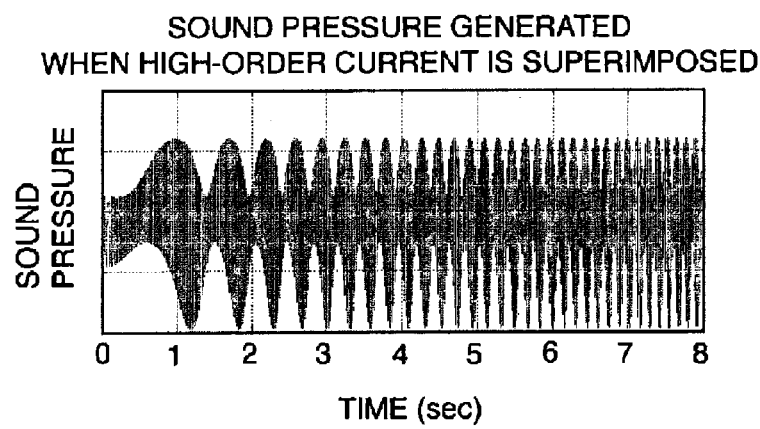

As FIGS. 3A and 3B indicate, beat noise occurs as two noises with frequencies very close to each other are superposed and the sound pressure rises and falls repeatedly with a frequency equivalent to the difference between the frequencies of two noises as a result, as shown in FIG. 4C. When adding beat noise to the operating noise of an electric motor, it is necessary to ensure that the frequency of the noise to be added is very close to the frequency of the operating noise of the electric motor but not exactly the same as the frequency of the electric motor operating noise.

Accordingly, the controller 3 calculates a current instruction value by adding a basic current higher-order component of the basic current to the basic current in a the drive current for the electric motor 5. The controller 3 generates beat noise by outputting the current instruction value to the inverter 4 and thus generating at the electric motor 5 noise with a frequency very close to the frequency of the primary operating noise.

Figure 5:
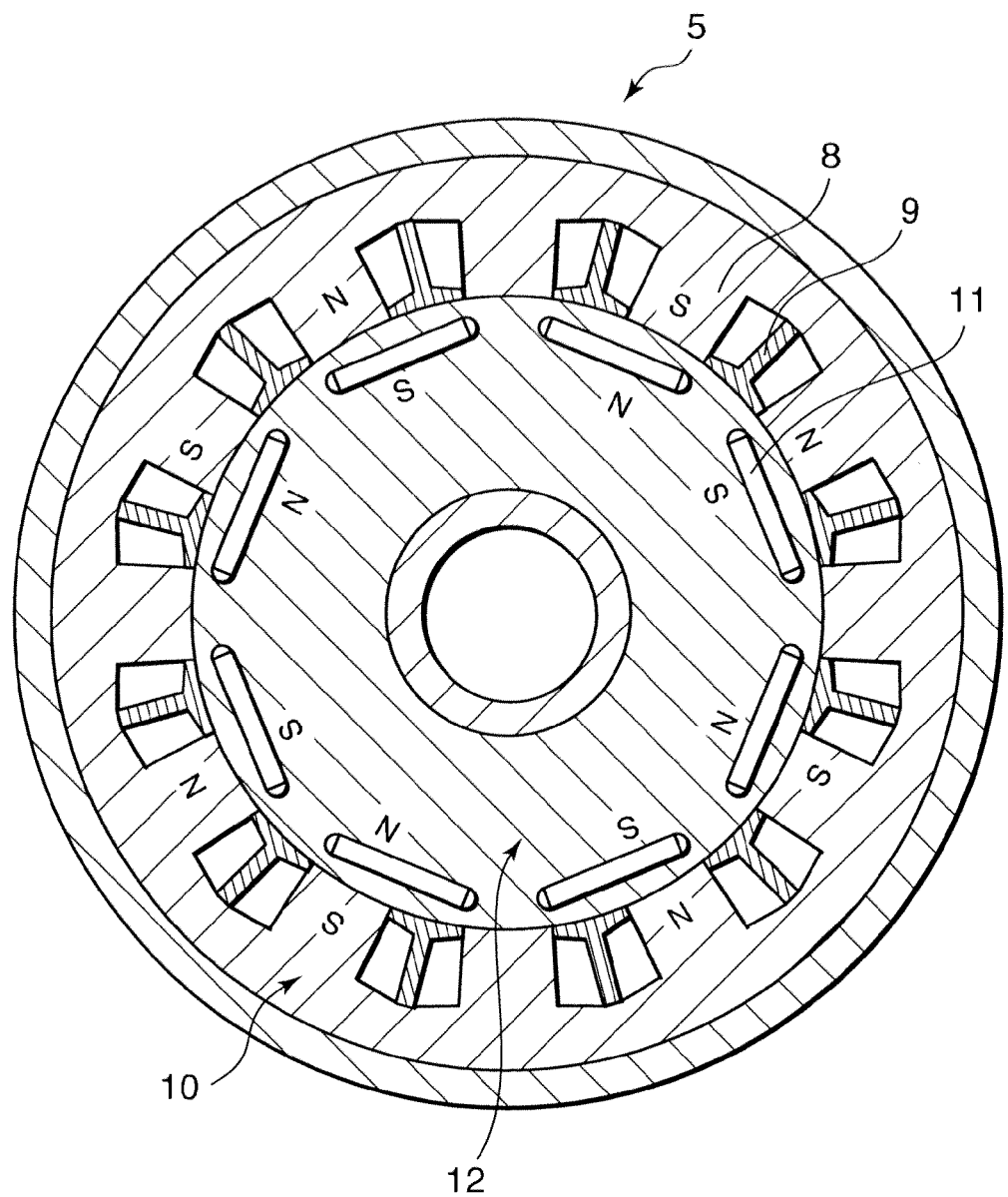
FIG. 5 is a cross-sectional view of an electric motor in conjunction with which this invention may be adopted.

Referring to FIG. 5, the electric motor 5 comprises a stator 10 and a rotor 12. The stator 10 includes twelve coils 9 formed in 3 phases, i.e., a U-phase, a V-phase and a W-phase alternately wound through teeth 8. The coils 9 are wound in concentrated windings. The rotor 12 includes eight permanent magnets 11 disposed with equal angular intervals along the outer circumference. By disposing permanent magnets with the outer circumferential sides thereof polarized as N poles next to S poles in an alternating pattern, the permanent magnets 11 are made to constitute a permanent magnet with four pairs of poles By adopting the structural features described above, an electric motor 5 with a concentrated winding, which includes four pairs of poles and 12 slots, is formed. In an electric motor with four pairs of poles, permanent magnets 11 forming a single pair of poles at the rotor 12 correspond to three slots in the stator 10 at a mechanical angle of 90°.

Figure 6A:
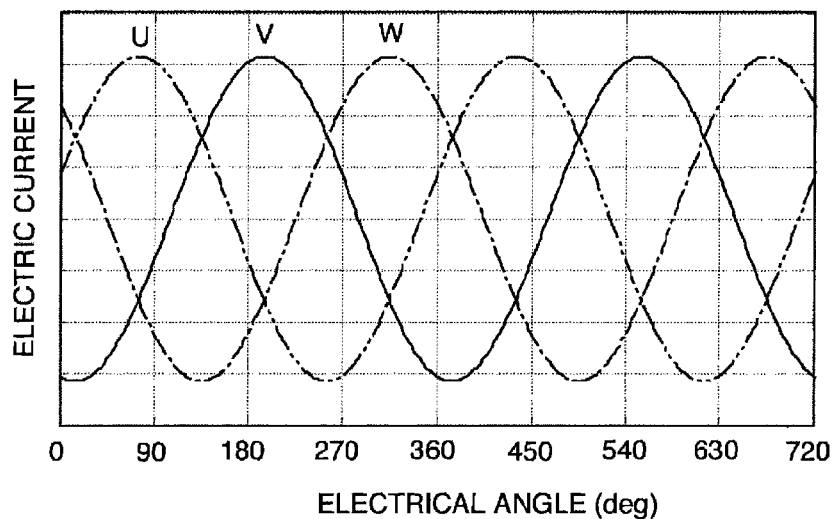
FIGS. 6A and 6B are diagrams respectively indicating the waveforms of the basic drive currents at the electric motor and the waveforms of higher-order electrical currents applied by the operating noise control device.

Referring to FIG. 6A, the electric motor 5 is driven as a basic current with a sinusoidal waveform, each cycle of which is equivalent to the mechanical angle of 90°, is applied the coils 9. In other words, the mechanical angle of 90° at the electric motor 5 is equivalent to an electrical angle of 360°.

In this situation, a mode referred to as a 0th order circular mode, in which a radial component of the electromagnetic force applied between the rotor 12 and the stator 10 at a frequency in an electrical angle 6th order (6 being the least common multiple of 2 representing the number of poles at the rotor 12 and 3 representing the number of slots at the stator 10), i.e., corresponding to the mechanical angle 24th order, works on all the teeth at a uniform phase, is assumed. In the 0th order circular mode, loud operating noise is bound to occur since the stator 10 vibrates as if it were a breathing sphere likely to make the loudest noise by uniformly expanding and contracting along the radial direction.

Figure 6B:
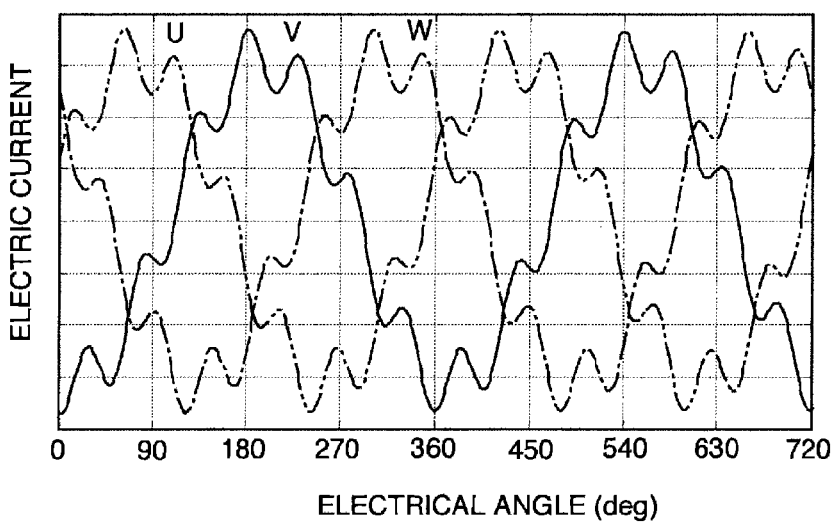

Referring to FIG. 6B, when a higher-order component is added to the drive current of the electric motor 5, the current is electromagnetically converted and that the order of the electromagnetic oscillating force generated under such circumstances will be ±1 relative to the order of the higher-order component included in the drive current. The operating noise control device in the embodiment generates an electromagnetic oscillating force of a 6.05th order in correspondence to an electromagnetic oscillating force in an electrical angle 6th order, i.e., the primary order of the electric motor operating noise.

Figure 7A:
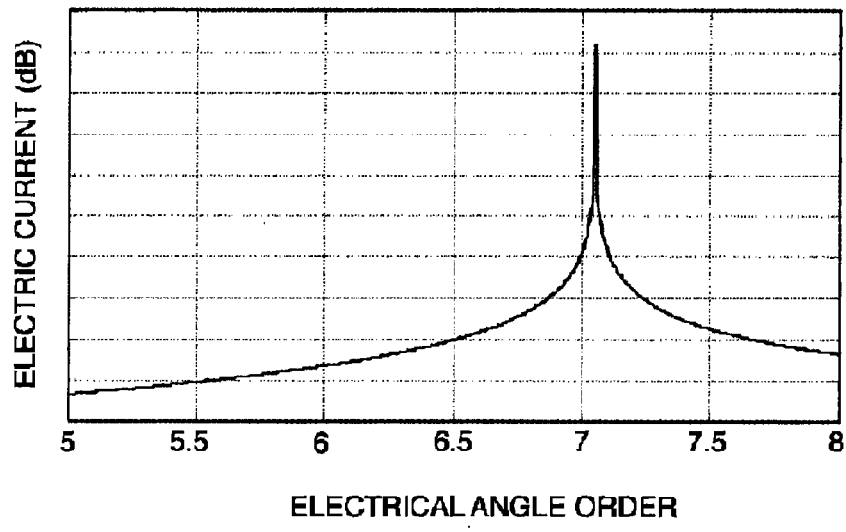
FIGS. 7A and 7B are diagrams showing the characteristics of an electrical angle order of a higher-order electrical current added to the basic drive current by the operating noise control device and the characteristics of an oscillating force occurring as a result of the higher-order electrical current application.
Figure 7B:
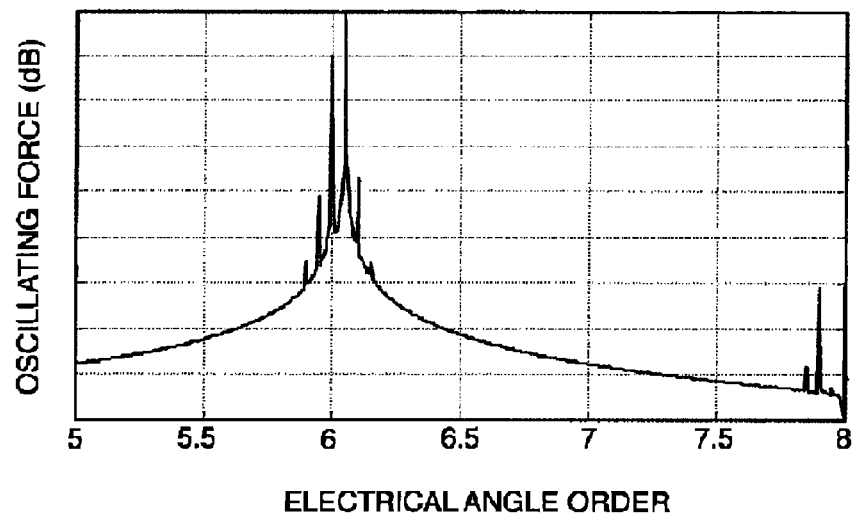

Referring to FIG. 7A, for these purposes, the controller 3 adds a 7.05th order component to the drive current at the electric motor 5. As a result, an oscillating force of the 6.05th order is generated as indicated in FIG. 7B.

In more specific terms, the controller 3 calculates current instruction values Iu, Iv, and Iw for the inverter 4 by adding a 7.05th order component to the basic current with an amplitude $I_0$ and a phase $\theta_0$, which are determined in correspondence to the operating condition, as expressed in a following Equations (1).

$$I_u = I_0 \cdot \sin(\theta + \theta_0) + I_1 \cdot \sin(7.05\theta + \theta_n)$$

$$I_v = I_0 \cdot \sin\left(\theta + \theta_0 - \frac{2}{3}\pi\right) + I_1 \cdot \sin\left(7.05\theta + \theta_n - \frac{2}{3}\pi\right) \quad (1)$$

$$I_W = I_0 \cdot \sin\left(\theta + \theta_0 - \frac{4}{3}\pi\right) + I_1 \cdot \sin\left(7.05\theta + \theta_n - \frac{4}{3}\theta\right)$$

$\theta_n$ represents a correction value used in order to ensure that the higher-order component current will not be disrupted even as the subsequent cycle of the electrical angle $\theta$ starts and its value switches from $2\pi$ to 0. It can be defined as expressed in a Equation (2) below by using a correction value $\theta_{n-1}$ used in the preceding electrical angle cycle.

$$\theta_0 = 7.05 \cdot 2\pi + \theta_{n-1} \quad (2)$$

The amplitude $I_1$ of the higher-order component current in this operating noise control device can be expressed as in a Equation (3) below.

$$I_1 = 0.2 \cdot I_0 \quad (3)$$

As these currents are supplied from the inverter 4 to the electric motor 5, an oscillating force corresponding to the electrical angle 6.05th order is generated at the electric motor 5 in addition to the initial oscillating force of the electrical angle 6th order.

Figure 8A:
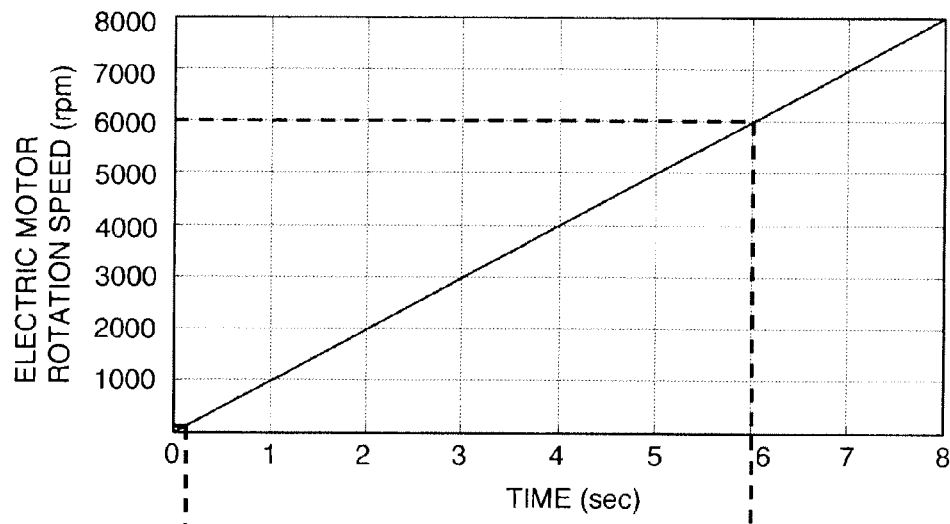
FIGS. 8A and 8B are diagrams showing the characteristics of beat noise generated by the operating noise control device by adding the higher-order electrical currents.
Figure 8B:
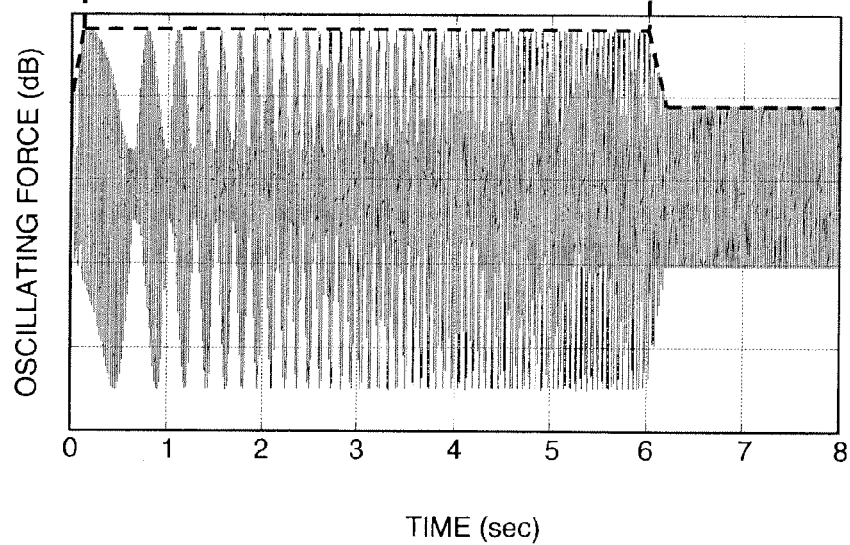

Referring to FIGS. 8A and 8B, beat noise assuming a frequency in an electrical angle 0.05th order, i.e., a mechanical angle 0.2th order, is generated with these two oscillating forces.

Since the beat frequency of the beat noise is in proportion to the rotation speed of the electric motor 5, the beat frequency increases as the rotation speed rises. However, once the difference between the frequencies of the two noises becomes significant, the beat noise will cease to sound like a beat but instead will sound like a chord of the two noises. In the range over which the beat noise changes to the chord, the sound will likely be perceived as unpleasant.

Figure 9:
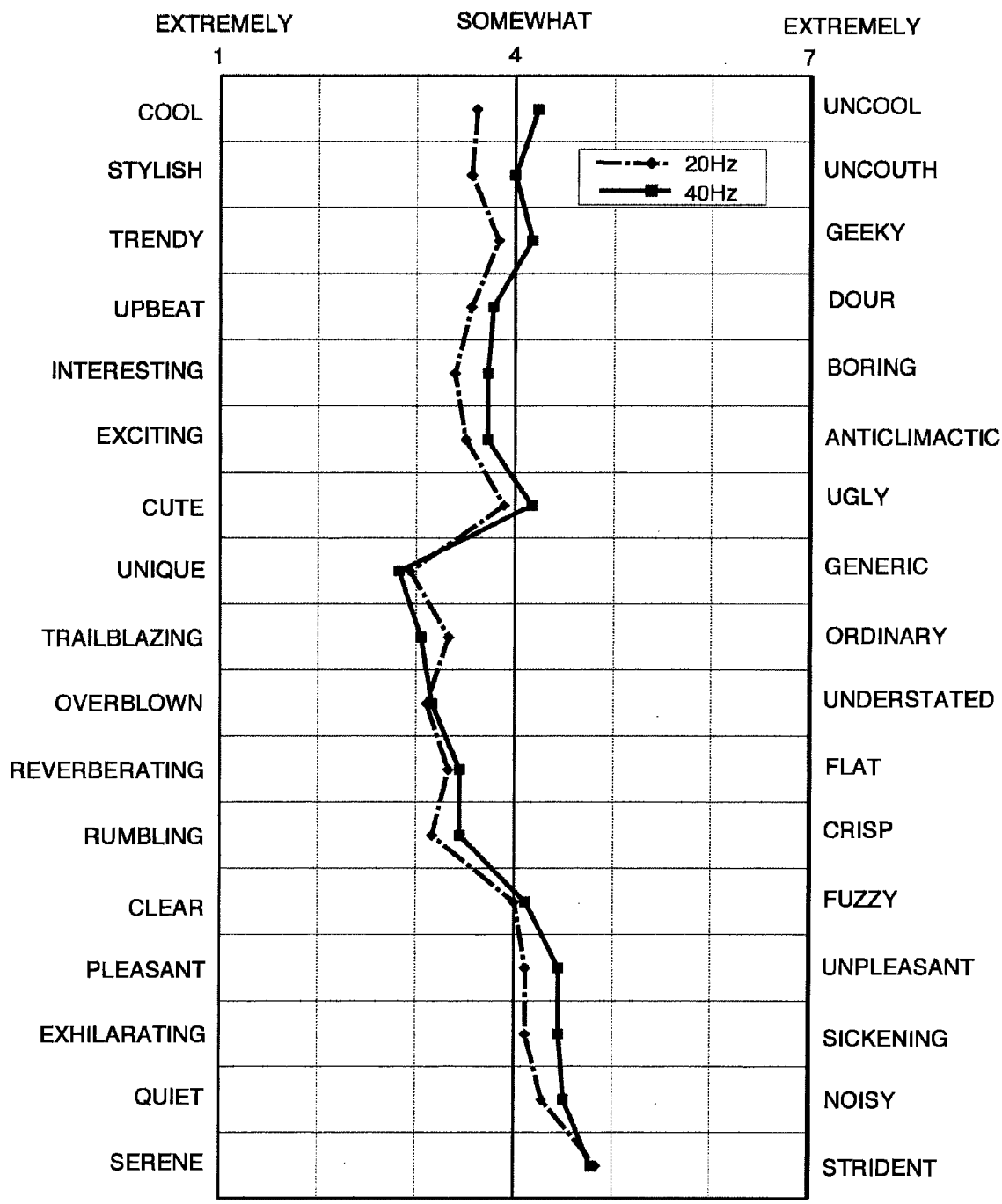
FIG. 9 is a diagram providing the results of an evaluation conducted by the inventors to gauge the tonal quality of beat noises at various frequencies by adopting the SD method.

Of the tonal quality evaluation results obtained by the inventors by conducting the evaluation of the noise through the SD method, the results of the evaluation of noise with the beat frequency reaching 20 Hz and the results of the evaluation of noise with the beat frequency reaching 40 Hz as the rotation speed further increased, are compared in FIG. 9. Until the frequency reached 20 Hz, the evaluation results substantially identical to those in beat-free noise were recorded for the pair of adjectives "pleasant/unpleasant". However, the evaluation results indicate that the subjects were more likely to find noise at frequencies closer to 40 Hz more "unpleasant". These facts are indicative that a cutoff point at which the subject is likely to find the beat noise unpleasant within a beat frequency range between 20 Hz and 40 Hz.

The beat frequency in this case is equivalent to the frequency difference between the frequency of the electromagnetic oscillating force in the electrical angle 6.05th order and the frequency of the electromagnetic oscillating force in the electrical angle 6th order. When the electric motor 5 rotates at a rotation speed of 6000 rpm, this frequency difference will be; 2420 Hz-2400 Hz=20 Hz.

Based upon these findings, the controller 3 reduces the amplitude $I_1$ of the higher-order component current in expression (1) toward zero when the rotation speed of the electric motor 5 is equal to or above 6000 rpm and the beat frequency is thus equal to or greater than 20 Hz until it ultimately stops the application of the higher-order component current.

Consequently, the beat noise is drastically reduced over a high-speed rotation range in which the rotation speed of the electric motor 5 is equal to or greater than 600 rpm, as indicated in FIGS. 8A and 8B.

When the frequency is very low, on the other hand, the beat noise may set up a body vibration mode in which the body vibrates with a significant amplitude at a low resonance frequency, thus increasing the amplitude of the oscillating force attributable to the beat, and causing the body to vibrate even more. The operating noise control device in the embodiment holds back the amplitude of the oscillating force so that it does not increase rapidly at very low vibration frequencies up to an oscillating force frequency of 50 Hz in the electrical angle 6th order, i.e., the mechanical angle 24th order, at which the extent of the body vibration will become an issue. Namely, the value of the amplitude $I_1$ is made to increase linearly relative to the rotation speed of the electric motor 5, from the amplitude of 0 corresponding to a rotation speed of 0 rpm at the electric motor 5 to an amplitude $I_1$ at a rotation speed of 125 rpm of the electric motor 5, so that an amplitude $I_1$ of the higher-order component current expressed in (3) is achieved when the electric motor 5 rotates at a rotation speed of 125 rpm, which corresponds to the oscillating force frequency of 50 Hz in the electrical angle 6th order, i.e., the mechanical angle 24th order.

When the vehicle is not accelerating, the beat noise may be perceived as unpleasant, as explained earlier, and for this reason, the operating noise control device does not add the higher-order component current and does not generate any beat noise under non-accelerating conditions.

The operating noise control device generates beat noise exclusively when the electric motor 5 rotates in a predetermined acceleration range and thus creates a new and exciting accelerating sound for the electric vehicle without inducing any unpleasant noise or vibration.

Referring to FIGS. 10A-10C, FIGS. 11A and 11B, FIGS. 12A-12C, FIGS. 13A-13C, FIGS. 14A and 14B and FIGS. 15A and 15B, a second embodiment of this invention will be described.

This embodiment assumes a hardware configuration identical to that of the first embodiment and is distinguishable from the first embodiment only in the method adopted for higher-order component current application.

Figure 10A:
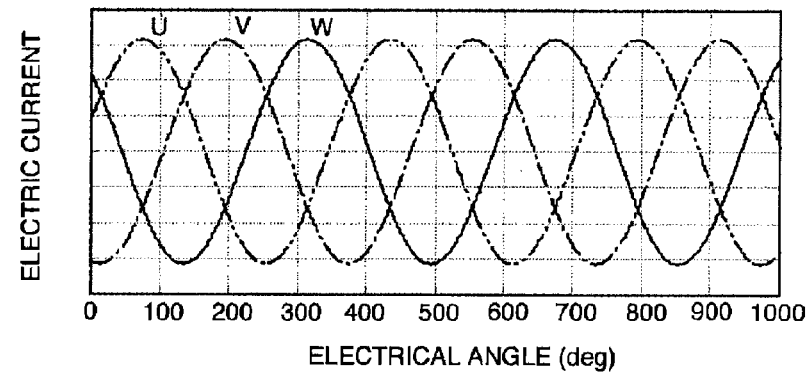
FIGS. 10A-10C are diagrams showing drive currents created by the operating noise control device according to a second embodiment of this invention.
Figure 10B:
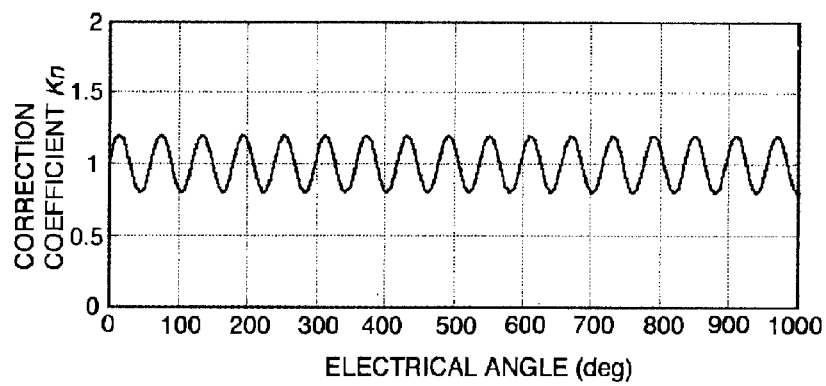
Figure 10C:
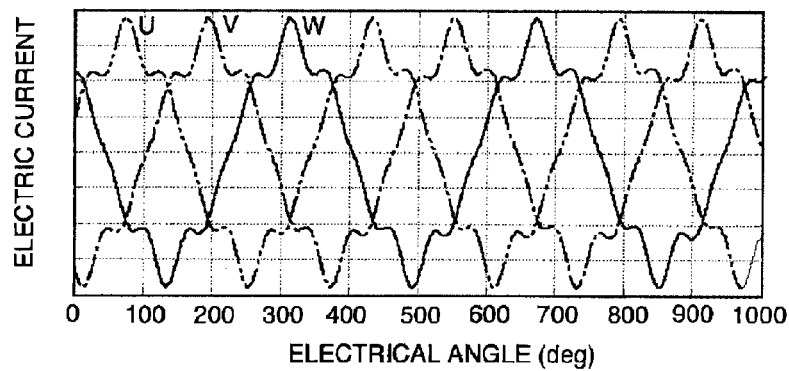

FIGS. 10A-10C indicate that the controller 3 in this embodiment controls the drive current for the electric motor 5 with current instruction values in FIG. 10C calculated by multiplying the basic current in FIG. 10A by a correction coefficient $K_n$ shown in FIG. 10B and defined in expression (4) below. A drive current corresponding to the current instruction values is then applied to the coils at the electric motor 5.

$$K_n = 1 + q \cdot \sin\{(6+p)\cdot\theta + \theta_n\} \quad (4)$$

where,
$\theta_n = 2\pi \cdot (6+p) + \theta_{n-1}$;
$\theta$=electrical angle; and
p, q,=coefficients determined in correspondence to the vehicle operating condition.

As expression (4) indicates, the correction coefficient $K_n$ is the sum of 1 and a sin function which assumes characteristics whereby its time average is equal to 1.

Figure 11A:
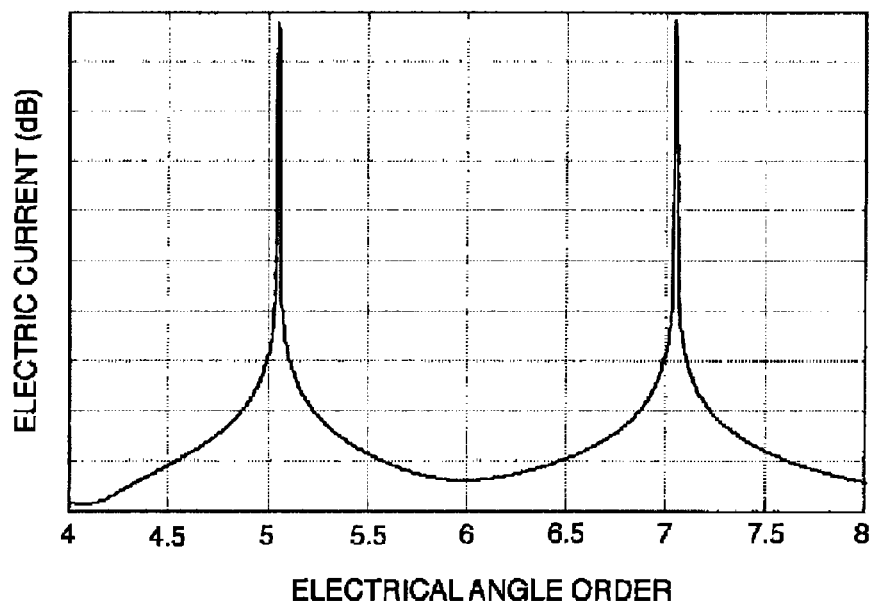
FIGS. 11A and 11B are diagrams showing the characteristics of an electrical angle order of a higher-order electrical current added to the basic drive current by the operating noise control device according to the second embodiment of this invention and the characteristics of the oscillating force occurring as a result of the higher-order electrical current application.
Figure 11B:
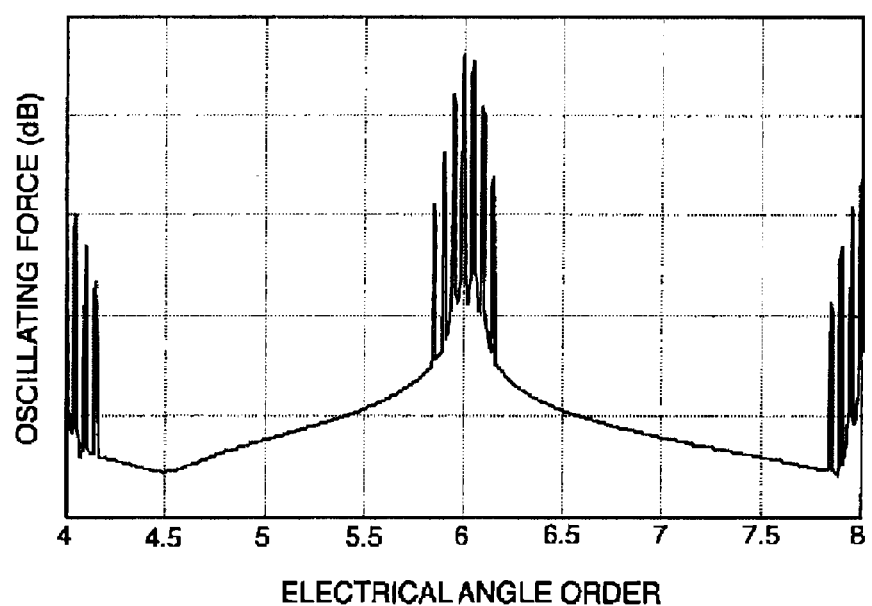

Through this correction achieved by multiplying the basic current by a higher-order component, i.e., the (6+p)th order component, as described above, a higher-order component current assuming the (6+p±1)th order, as shown in FIG. 11A, is added to the drive current. As a result, the oscillating force generated at the electric motor 5 will include a new component corresponding to the electrical angle (6+p)th order, as shown in FIG. 11B. Through these measures, the operating noise control device generates beat noise when the electric motor 5 rotates in a predetermined acceleration range and thus creates a new and exciting accelerating sound for the electric vehicle without subjecting the driver to any unpleasant noise or vibration, as in the first embodiment.

Figure 12A:
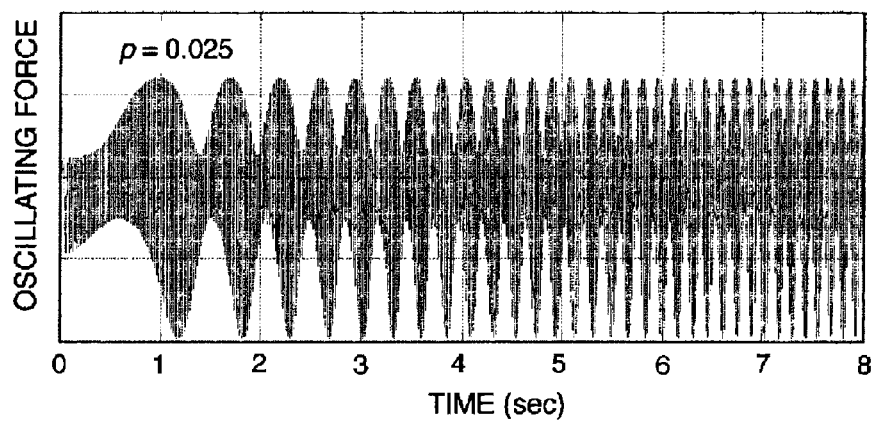
FIGS. 12A-12C are diagrams indicating how the beat noise characteristics are altered by assuming different values for a coefficient p.
Figure 12B:
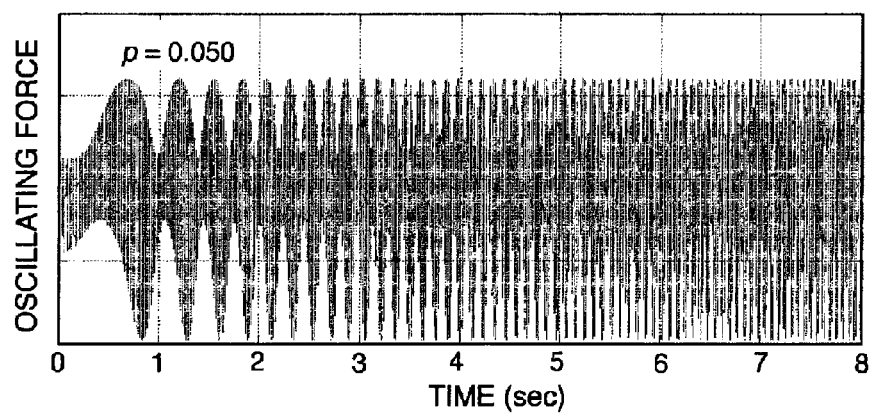
Figure 12C:
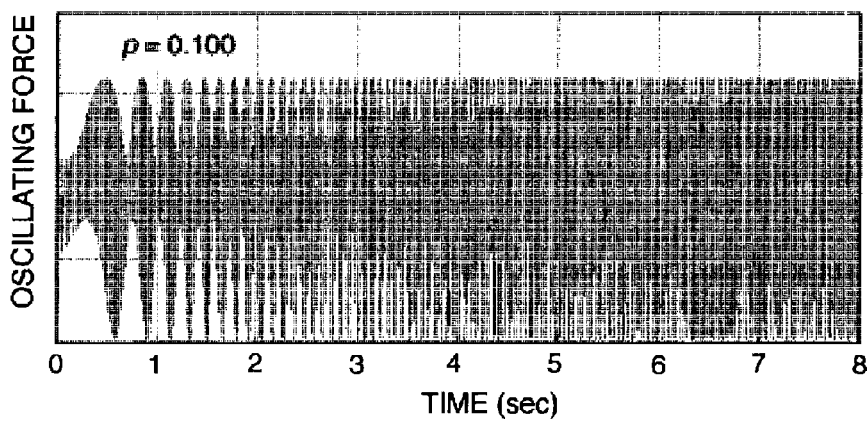

FIGS. 12A and 12B indicate that the beat frequency increases in direct proportion to the value assumed for the coefficient p. This means that a desirable beat frequency can be freely selected by setting an optimal value for the coefficient p.

Figure 13A:
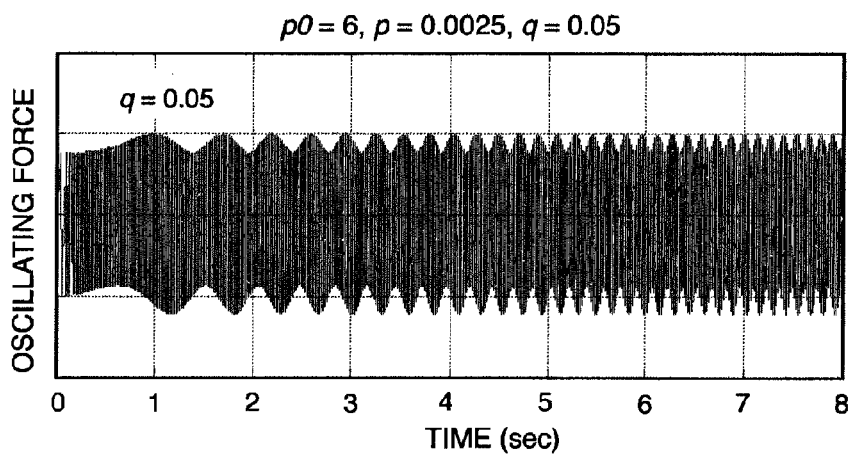
FIGS. 13A-13C are diagrams indicating how the beat noise characteristics are altered by assuming different values for a coefficient q.
Figure 13B:
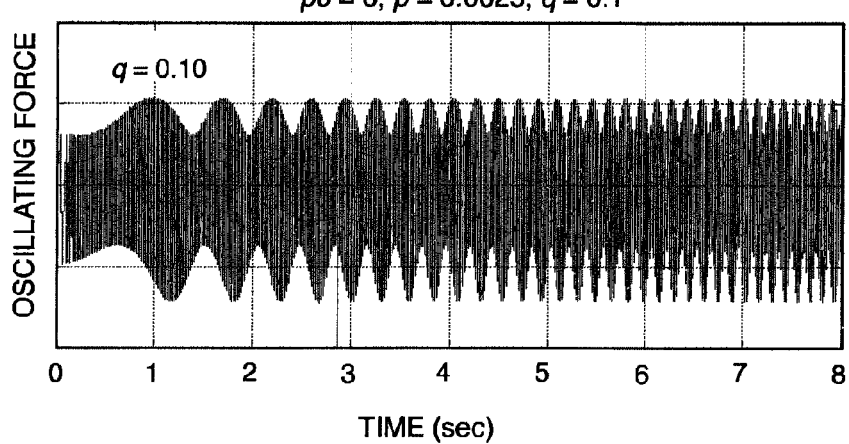
Figure 13C:
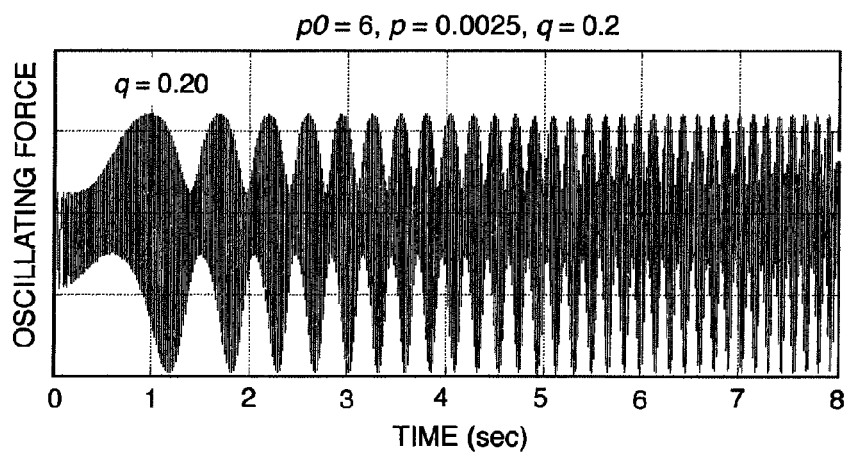

FIGS. 13A and 13B indicate that a greater beat fluctuation amplitude, i.e., a higher level of beat strength, is achieved when the coefficient q assumes a larger value. This means that any desired level of beat strength can be selected by setting the coefficient q to a specific value. Thus, a desired beat noise can be created by setting the coefficient p and the coefficient q in a specific combination.

In the embodiment, the coefficient p and the coefficient q are set in correspondence to the degree of application of the accelerator pedal in the vehicle. Namely, the coefficient p is set to assume a larger value as the degree of accelerator pedal openness increases so that a more acute sensation of acceleration is created by causing the beat frequency to rise faster as the rotation speed of the electric motor 5 increases. In addition, the coefficient q is also set to assume a larger value as the degree of the accelerator pedal openness increases, so that the feel of the beat is further enhanced.

In this embodiment also, the application of the higher-order component current is stopped once the rotation speed of the electric motor 5 enters a high speed range, so as not to subject the driver to any discomfort when the beat frequency becomes equal to or greater than 20 Hz. In an electric motor 5 with 4 pairs of poles, the beat frequency can be calculated as; Nm×(p/60)×4 with Nm(rpm) representing the rotation speed of the electric motor 5.

Figure 14A:
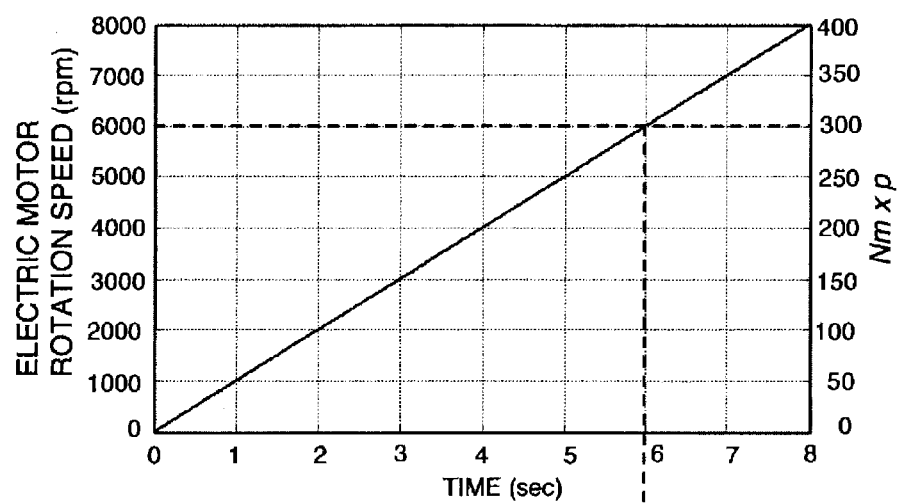
FIGS. 14A and 14B are diagrams showing higher-order electrical current processing executed by the operating noise control device according to the second embodiment of this invention when the electric motor rotates at a high rotation speed.
Figure 14B:
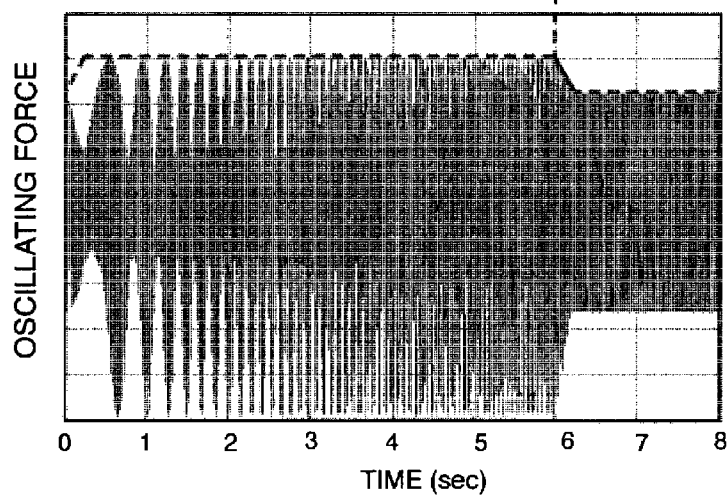

Accordingly, the controller 3 stops the higher-order component current application and thus stops the beat noise generation by decreasing the value assumed for the coefficient q toward zero once Nm×p exceeds 300 due to an increase in the rotation speed Nm(rpm) of the electric motor 5, as indicated in FIGS. 14A and 14B.

In addition, as the oscillating force in an electrical angle 6th order is applied to a radial direction component of the electromagnetic oscillating force, as well as to the radial direction component in the electromagnetic oscillating force, a torque ripple occurs. The torque ripple generated as a result of the higher-order component current application also causes beat noise. In more specific terms, the torque ripple causes vibration of the body, and the vibrating noise occurring as the body vibrates contributes to beat noise that reverberates within the cabin. However, since beat noise with a very low frequency excites vibration of the vehicle with a low resonance frequency and a large amplitude, the vibration of the vehicle is bound to be exacerbated by the increase in the oscillating force amplitude attributable to the beat noise. In various vibration modes, a drive shaft torsional resonance mode is considered to be particularly problematic. Torque ripple excites drive shaft torsional resonance. As such torsional resonance is converted to back and forth, vibration via the wheels, the back-and-forth vibration of the body will intensify. The drive shaft torsional resonance mode occurs at 10 Hz.

Figure 15A:
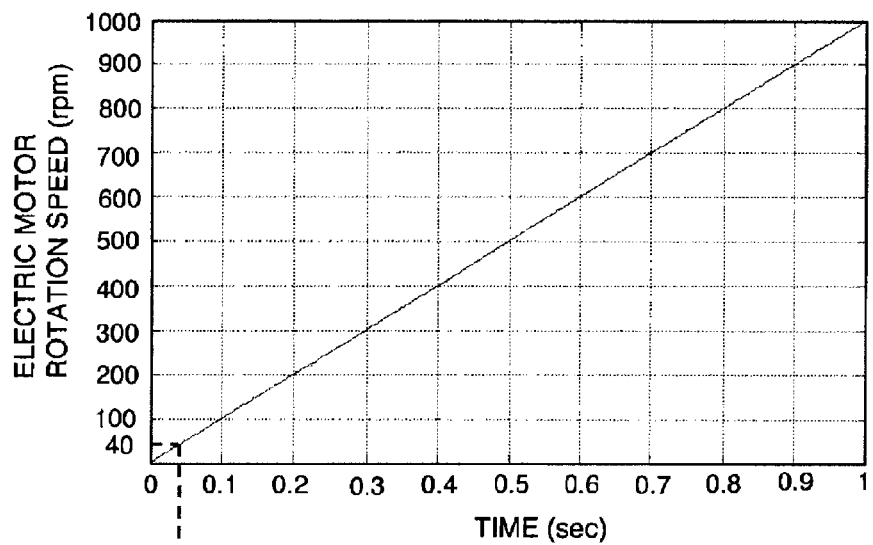
FIGS. 15A and 15B are diagrams showing higher-order electrical current processing executed by the operating noise control device according to the second embodiment of this invention when the electric motor rotates at a low rotation speed.
Figure 15B:
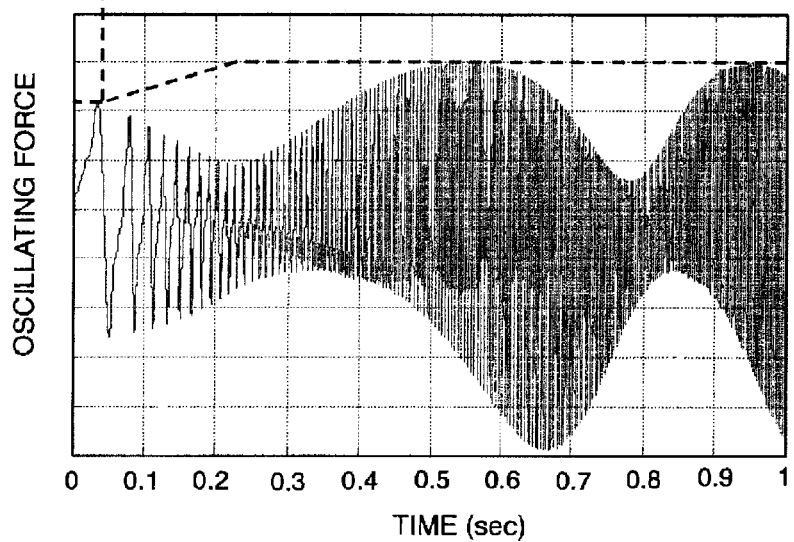

In order to ensure that the vibration conditions do not worsen in a range around this resonance frequency, the controller 3 does not add the higher-order current component until the rotation speed of the electric motor 5 reaches 40 rpm, at which the frequency in the electrical angle 6th order, i.e., the mechanical angle 24th order, is 16 Hz and subsequently increases the value of the coefficient q from 0 to the initial setting value, as indicated in FIGS. 15A and 15B.

In addition, when the vehicle is not accelerating, the beat noise may be perceived as unpleasant, as explained earlier in reference to the first embodiment. For this reason, the controller 3 in this embodiment does not add the higher-order component current to generate beat noise under non-accelerating conditions either.

The operating noise control device in this embodiment generates beat noise under beat noise control executed in correspondence to the degree of accelerator pedal application and thus creates a new and exciting accelerating sound for the electric vehicle without subjecting the driver to any unpleasant noise or vibration.

Figure 16:
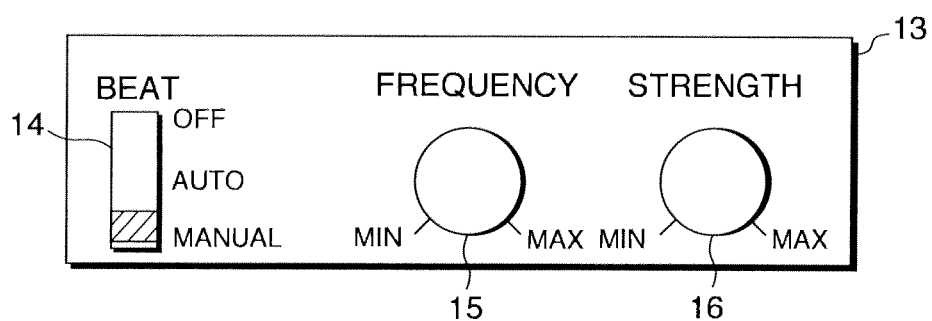
FIG. 16 is a front view of an external operation panel included in the operating noise control device according to a third embodiment of this invention.

Referring to FIG. 16, a third embodiment of this invention will be described.

This embodiment is achieved by further adding an external operation panel 13 via which the driver is able to select any beat noise setting to the beat noise generation system in the second embodiment.

The external operation panel 13 is installed near the driver's seat in the vehicle 1. The external operation panel 13 includes a beat noise ON/OFF switch 14, a beat frequency adjustment dial 15, and a beat strength adjustment dial 16.

The beat ON/OFF switch 14 can be set to one of three positions, OFF, AUTO and MANUAL. The beat frequency adjustment dial 15 is operated when setting the coefficient p in Equation (4). The beat strength adjustment dial 16 is operated when setting the coefficient q in Equation (4).

If the driver selects the OFF position at the beat ON/OFF switch 14, the controller 3 does not add the higher-order component current to the drive current and thus, no beat noise is generated.

If the driver selects the AUTO position, the controller 3 executes drive current control similar to that described in reference to the second embodiment. Beat noise is generated at the electric motor 5 as a result.

If the driver selects the MANUAL position, the controller 3 generates beat noise based upon the coefficient p set via the beat frequency adjustment dial 15 and the coefficient q set via the beat strength adjustment dial 16. As the beat frequency adjustment dial 15 is turned clockwise, a larger value is set for the coefficient p so as to increase the beat frequency. As the beat strength adjustment dial 16 is turned further clockwise, a larger value is set for the coefficient q so as to increase the beat strength.

The driver, allowed to manually select beat noise settings as described above, is able to customize the beat noise. The driver is thus able to drive a vehicle generating operating noise to his liking.

Referring to FIGS. 17 and 18, FIGS. 19A and 19b, FIGS. 20A and 20B, FIG. 21, FIGS. 22A and 22B and FIGS. 23A and 23B, a fourth embodiment of this invention will be described.

Figure 17:
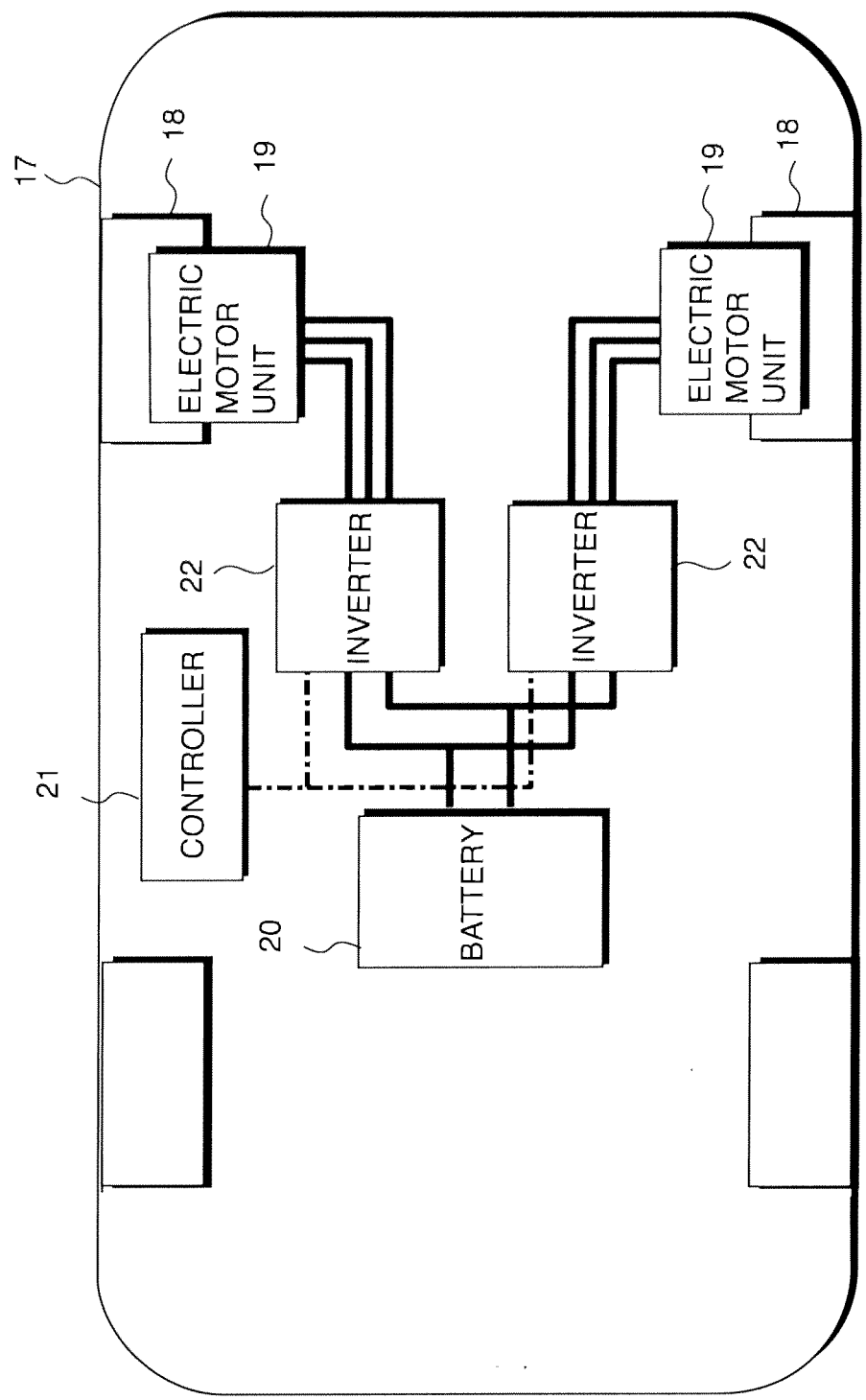
FIG. 17 is a schematic block diagram showing the structure adopted in an electric vehicle that includes the operating noise control device according to a fourth embodiment of this invention.

Referring to FIG. 17, a vehicle 17 is an in-wheel motor type vehicle with an electric motor unit 19 installed at each of two rear wheels 18. The vehicle 17 includes a single battery 20, in which electric power supplied from an external power source is stored, two inverters 22, which convert DC power from the battery 20 to three-phase AC power based upon a command issued by a controller 21 and two electric motor units 19 rotationally driven individually with the three-phase AC power provided from the inverters 22.

Figure 18:
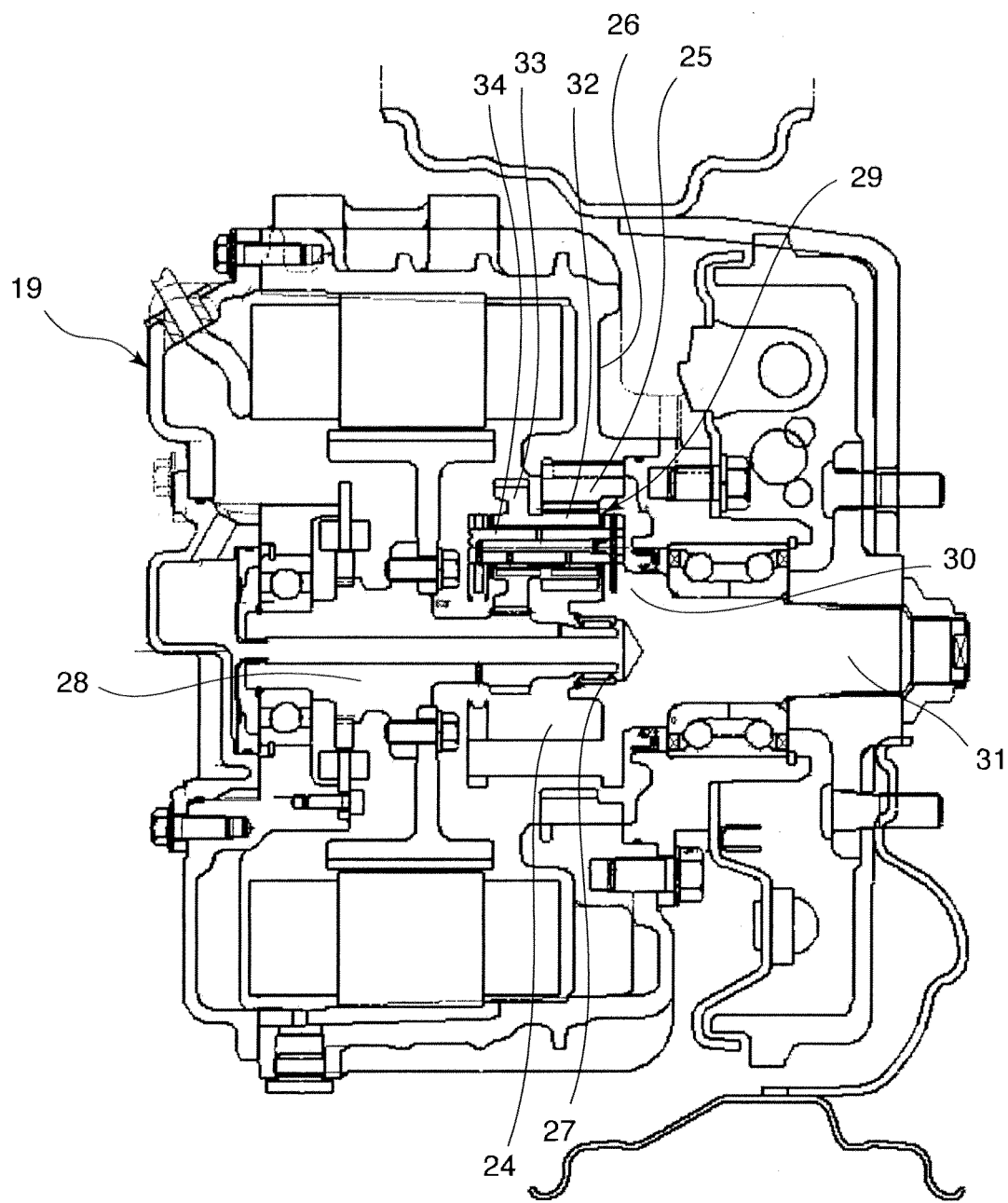
FIG. 18 is a schematic diagram of an electric motor unit used in the fourth embodiment of this invention.

Referring to FIG. 18, the electric motor units 19 are each constituted with an electric motor and a reduction gear 24. The reduction gear 24 is constituted with a planetary gear mechanism. The planetary gear mechanism includes a ring gear 25 securely attached to a reduction gear case 26, a sun gear 27 securely attached to a rotor shaft 28 of the electric motor and a planet carrier 30 that supports three planet gears 29 disposed between the ring gear 25 and the sun gear 27. The rotation of the planet carrier 30 is transmitted to the corresponding rear wheel 18 via an output shaft 31.

The planet gears 29 are each constituted with a small-diameter pinion 32 and a large-diameter pinion 33, both formed on a single planet gear shaft 34. As the small-diameter pinions 32 interlock with the ring gear 25 and the large-diameter pinions 33 interlock with the sun gear 27, a large reduction ratio is achieved with the reduction gear 24. The planet carrier 30 rotatably holds the three planet gears 29 over equal angular intervals.

In the embodiment, beat noise is generated by adjusting the frequency of the operating noise of the built-in reduction gear 24 in the electric motor unit 19 close to the frequency of the operating noise generated at the electric motor.

In the embodiment, the number of teeth at the ring gear 25 is set to 63, the number of teeth at the sun gear 27 is set to 21, and the number of teeth at the small-diameter pinion 32 and the number of teeth at the large-diameter pinion 33 in each planet gear 29 are respectively set to 18 and 36. By setting the numbers of teeth to these values, a reduction gear 24 is made to achieve a reduction ratio of 7:1, and the ring gear 25 and the sun gear 27 are made to assume interlocking orders of 63 and 126 respectively relative to the rotation of the output shaft 31. The electric motor comprises a rotor with 18 poles and a stator with 57 slots, and the operating noise generated at the electric motor corresponds to the 18th order rotation of the electric motor and its higher harmonic component.

In the first embodiment, the 0th order circular mode is assumed at the frequency corresponding to the electrical angle 6th order with the value 6 representing the least common multiple of the number of poles (=2) at the rotor 12 and the number of slots (=3) at the stator 10 corresponding to the mechanical angle of 90°, i.e., at the frequency in the mechanical angle 24th order. The largest operating noise is generated with the electromagnetic oscillating force corresponding to this order. In the current embodiment, on the other hand, the least common multiple in correspondence to which the 0th order circular mode is assumed is fairly large, at 342. This means that the level of the electromagnetic oscillating force imparted in the 0th order circular mode is fairly low and the resulting operating noise will thus be insignificant. However, an oscillating force of a lower order determined in correspondence to the number of poles at the rotor becomes an issue, and the largest oscillating force is imparted at the lowest order corresponding to the 18th order of electric motor rotation. The oscillating force corresponding to the 18th order of electric motor rotation is the 126th order oscillating force relative to the rotation of the output shaft 31, resulting from the speed reduction achieved via the reduction gear 24. This value matches the value representing the interlocking order (=126) of the sun gear 27.

While gears transmit torque as their teeth interlock, a force is applied at the interlocking area along the radial direction in addition to the force applied along the rotational direction, which imparts the torque. Since the radial force is imparted each time the gears interlock, it fluctuates with the interlocking cycles.

Figure 19A:
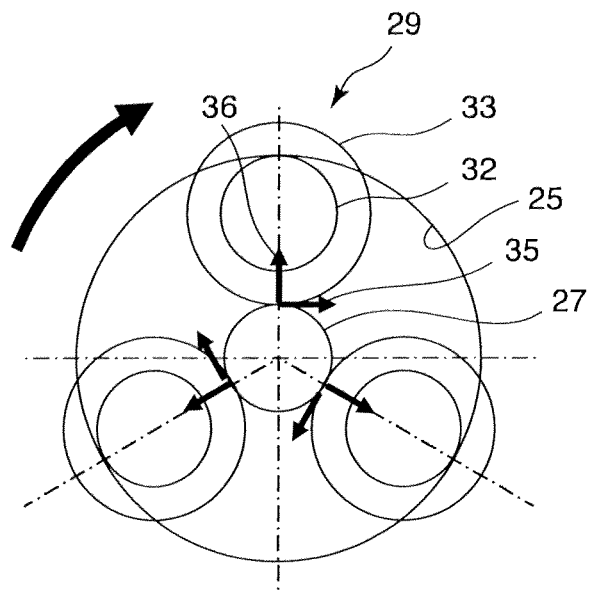
FIGS. 19A and 19B are diagrams showing a relationship between the interlocking phase at which planetary gears in a planetary gear unit included in the electric motor unit interlock and the oscillating force.

When the three planet gears 29, disposed with uniform angular intervals of 120°, interlock with the ring gear 25 and the sun gear 27 at the same time, a rotational force 35 and a radial force 36 with the same phase will be applied to each planet gear 29. In this situation, the level of the torque imparted by the rotational forces 35 to at the three individual planet gears 29 will match the sum of the forces in the same phase and the torque will include an interlocking frequency component, as shown in FIG. 19A. The resultant force representing the sum of the radial forces 36, on the other hand, is 0, since the radial forces cancel out one another in the vector sum of the forces generated as the three planet gears 29 interlock in the same phase.

Figure 19B:
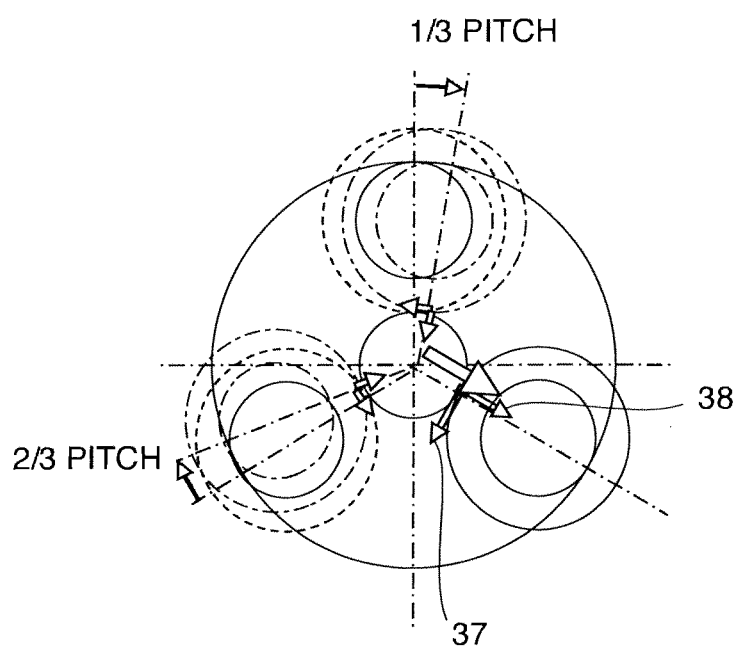

As shown in FIG. 19B, when the three planet gears do not interlock with a common phase and the three planet gears are offset relative to one another by an extent equivalent to an interlocking phase of 120°, i.e., by an extent equivalent to a ⅓ tooth width pitch, no torque will be generated with the rotational forces 37, since the interlocking frequency components corresponding to the three planet gears will be canceled out by one another. However the vector sum of the radial forces 38 is not zero and therefore, a fluctuation component attributable to the phase offset will be generated. The frequency of this fluctuation component will be the interlocking frequency in the rotation coordinate system on a rotating planet carrier 30. However, in a stationary coordinate system set in reference to the bearing of a stationary ring gear 25 or a stationary sun gear 27, the frequency of the fluctuation component will be modulated with the rotational frequency with which the planet carrier 30 rotates and thus, it will be equal to; the interlocking frequency±the rotational frequency with which the planet carrier 30 rotates corresponding to interlocking orders±1 order.

By assuming different interlocking phases as described above, the oscillating force can be generated as the gears interlock only for the rotational forces or only for the radial forces. The frequencies of the individual oscillating forces vary by an extent equivalent to a frequency corresponding to the first order rotation of the planet carrier 30. In addition, structurally speaking the radial forces rather than the rotational forces, readily induce vibration and cause louder operating noise.

In the embodiment, the order of the primary operating noise at the electric motor and the interlocking order of the reduction gear 24 are matched in order to ensure that beat noise is generated only during accelerating operation. In other words, under driving conditions with a light load on the electric motor, such as a steady speed traveling state, the interlocking phases of the planet gears 29 will match and the frequency of the operating noise at the electric motor and the frequency of the operating noise at the reduction gear 24 will match so that no beat noise is generated.

When the electric motor operates under a greater load, beat noise will be generated by offsetting the interlocking phases of the individual planet gears 29 and thus differentiating the frequency of the reduction gear noise from the frequency of the electric motor noise. In order to enable this processing, the reduction gear 24 includes an interlocking phase altering mechanism.

Referring to FIGS. 20A and 20B, the planet carrier 30 includes planet gear shaft holding surfaces 41A-41C in a three-layer structure. The planet gear shaft holding surfaces 41A-41C each support a planet gear shaft 34 of one of the planet gears 29. The planet gear shaft holding surfaces 41A-41C are formed so that they are allowed to rotate relative to one another. A planet gear spacer spring 42 that is preloaded through advance compression is disposed between the first planet gear shaft holding surface 41A, which is linked with the output shaft 31 and the second planet gear shaft holding surface 41B next to the first planet gear shaft holding surface 41A and also between the second planet gear shaft holding surface 41B and the third planet gear shaft holding surface 41C located next to the second planet gear shaft holding surface 41B. No planet gear spacer spring 42 is disposed between the first gear shaft holding surface 41A and the third planet gear shaft holding surface 41C. In other words, two planet gear spacer springs 42 are disposed. The interlocking phase altering mechanism is constituted with the planet gears 29, the planet carrier 30 and the planet gear spacer springs 42. The first planet gear shaft holding surface 41A is set so as to assume the innermost position among the three planet gear shaft holding surfaces 41A-41C.

At each planet gear 29, the large-diameter pinion 33 and the small-diameter pinion 32 are supported so that they are allowed to rotate relative to each other, with a pinion spacer spring 46 that is preloaded through advance compression disposed between the large-diameter pinion 33 and the small-diameter pinion 32.

As a rotational torque originating from the electric motor is input to the reduction gear 24, a torque transmission force is applied to the two planet gear spacer springs 42. As long as the level of this force does not exceed the preloaded pressure, the planet gear spacer springs 42 are not deformed. However, once the force exceeds the preloaded pressure, the planet gear spacer springs 42 become deformed. As the transmitted torque increases and the extent of the deformation of the planet gear spacer springs 42 becomes more significant, the planet gear shafts 34 come into contact with stoppers and thus any further deformation of the planet gear spacer springs 42 is disallowed. Similar deformation occurs at the pinion spacer springs 46 disposed between the pinions 33 and 32. The levels of the preloaded pressures at the springs 42 and the springs 46 and the spring constants of the springs 42 and the springs 46 are set in advance so that the springs 42 and the springs 46 start to deform at substantially the same level of transmitted torque and the planet gear shafts 34 come into contact with the stopper at substantially the same level of transmitted torque.

Figure 21:
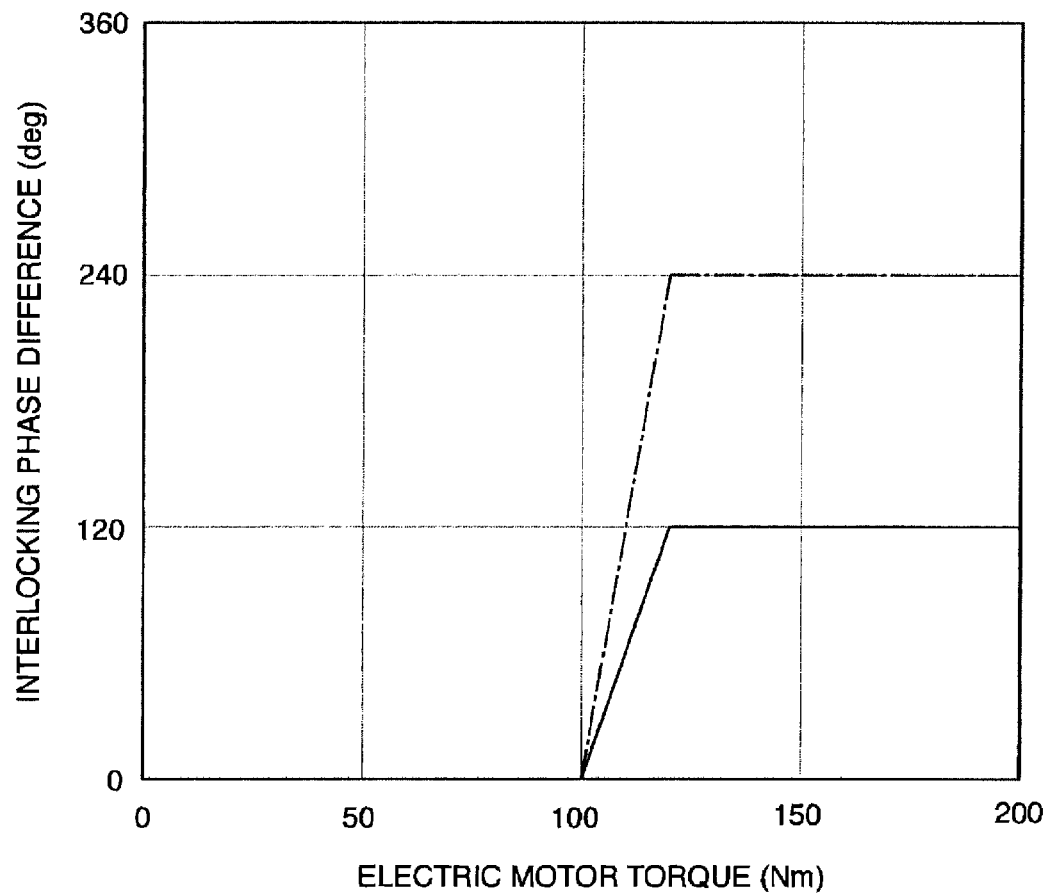
FIG. 21 is a diagram indicating a planet gear interlocking phase difference created by the operating noise control device according to the fourth embodiment of this invention.

Referring to FIG. 21, the levels of the preloaded pressures at the springs 42 and 46 and the spring constants of the springs 42 and 46 are set in advance so that the deformation of the springs 42 and 46 starts when the torque output from the electric motor is at 100 Nm and further deformation of the springs 42 and 46 is restricted by the stoppers at 120 Nm. In addition, when the springs 42 and 46, stopped by the stoppers, are at their maximum deformation, one planet gear shaft 34 is displaced by a ⅓ pitch relative to the tooth pitch assumed at the sun gear 27 and another planet gear shaft 34 is displaced by a ⅔ pitch relative to the tooth pitch assumed at the sun gear 27. Through these displacements, a 120° offset is created among the three planet gears 29 with regard to the interlocking phases with which the sun gear 27 and the planet gears 29 interlock. In other words, interlocking phase differences of 0°, 120° and 240° are created with respect to a given planet gear 29, which will give an interlocking phase difference total sum of 360°. As in this embodiment, the interlocking phase difference total sum achieved in conjunction with a planetary gear mechanism equipped with an odd number of planet gears will always be an integral multiple of 360°. For instance, interlocking phase differences that will manifest in conjunction with a planetary gear mechanism equipped with five planet gears will be 0°, 72°, 144°, 216° and 288°, with the interlocking phase difference total sum amounting to 720°, i.e., twice 360°. In addition, the interlocking phase difference manifested by any two successive planet gears will be an integral multiple of the value obtained by dividing 360° by the total number of planet gears.

A method that may be adopted when setting the spring constants for the planet gear spacer springs 42 disposed between the planet gear shaft holding surfaces 41A and 41B and between the planet gear shaft holding surfaces 41B and 41C will be described next. The two planet gear shaft holding surfaces 41 located next to each other are displaced by a ⅓ pitch relative to the tooth pitch assumed at the sun gear 27. The corresponding displacement angle is equal to 2π/63 rad. Such a displacement occurs while the output torque from the electric motor increases by 20 Nm, i.e., while the torque at the output shaft 31 increases by 140 Nm. Since the three planet gear shafts 34 are each subjected to ⅓ of the overall torque, the displacement of the individual planet gear shaft holding surfaces 41A-41C occurs while the torque at the output shaft 31 increases by 140/3 Nm.

In this situation, the torque corresponding to a single shaft is applied to the planet gear spacer spring 42 assuming the outer position between the outer planet gear shaft holding surface 41C, which is not linked with the output shaft 31 and the middle planet gear shaft holding surface 41B, whereas the torque corresponding to two shafts is applied to the inner planet gear spacer spring 42 that connects the inner planet gear shaft holding surface 41A, linked with the output shaft 31, and the middle planet gear shaft holding surface 41B. For this reason, a torsional spring constant of 468 Nm/rad is set for the outer planet gear spacer spring 42 and a torsional spring constant of 936 Nm/rad is set for the inner planet gear spacer spring 42. As indicated in FIG. 21, initial displacements applied to the springs 42 as the preloaded pressures in order to ensure that the planet gear spacer springs 42 do not start displacement until the output torque from the electric motor reaches 100 Nm are 0.10 rad both for the inner spring and the outer spring.

Figure 22A:
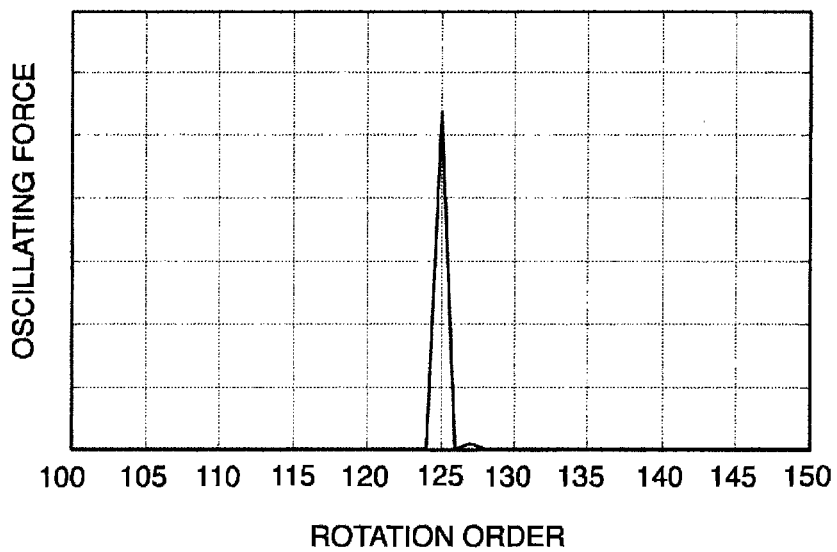
FIGS. 22A and 22B are diagrams showing a relationship between the order of rotation of the reduction gear brought forth by the interlocking phase altering mechanism according to the fourth embodiment of this invention and the oscillating force.
Figure 23A:
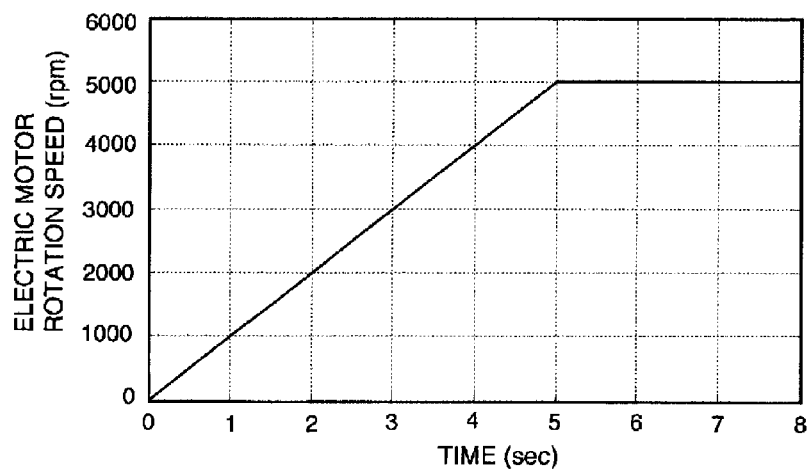
FIGS. 23A and 23B are diagrams showing the beat noise characteristics achieved in conjunction with the interlocking phase altering mechanism according to the fourth embodiment of this invention.
Figure 23B:
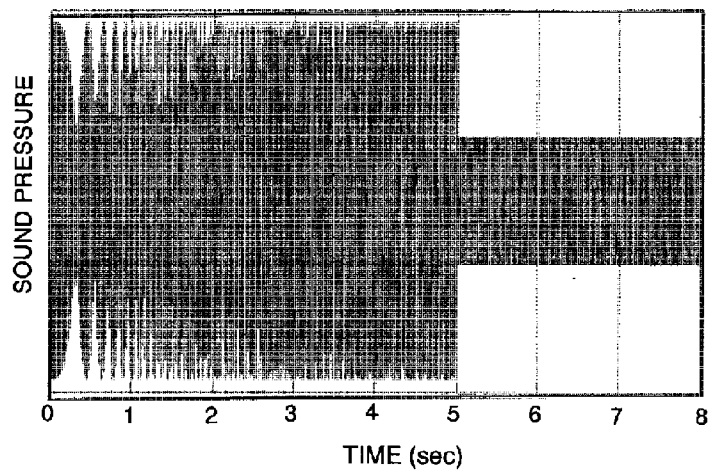

When the electric motor accelerates with an output torque equal to or greater than 120 Nm at the settings selected as described above, the reduction gear 24 generates an operating noise of the 125th order, an order smaller by one order relative to the interlocking order of the sun gear 27, as shown in FIG. 22A, due to the radial forces, which tend to generate noise more readily. As this operating noise is combined with the operating noise of the 126th order generated at the electric motor, the beat noise shown in FIGS. 23A and 23B is created.

Figure 22B:
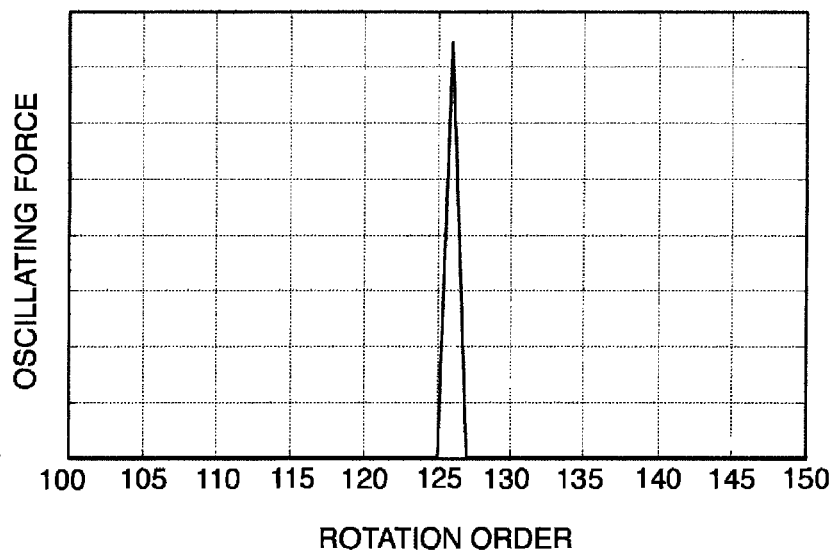

However, when the output torque from the electric motor is equal to or less than 100 Nm, as in a steady traveling state, an operating noise of the 126th order, i.e., an operating noise at a lower level, is generated at the reduction gear 24 due to the rotational forces, which do not induce noise readily, as indicated in FIG. 22B. The order of the operating noise at the reduction gear 24 matches the order of the operating noise at the electric motor and thus, no beat noise is created.

Through the measures described above, beat noise can be generated as the electric motor accelerates by assuming a specific structure in the reduction gear 24 without requiring any electronic control by the controller.

Referring to FIGS. 24A-24C and FIGS. 25A and 25B, a fifth embodiment of this invention will now be described.

Figure 24A:
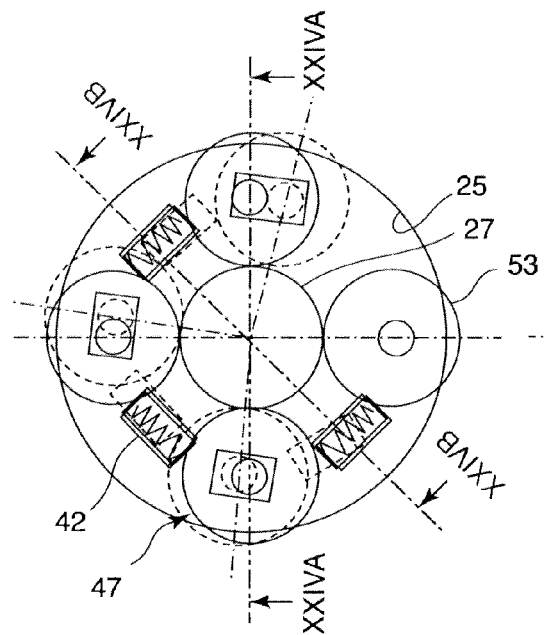
FIGS. 24A-24C show the interlocking phase altering mechanism included in the operating noise control device according to a fifth embodiment of this invention, in a schematic cross-sectional view and in schematic longitudinal sectional views of the planetary gear unit.
Figure 24B:
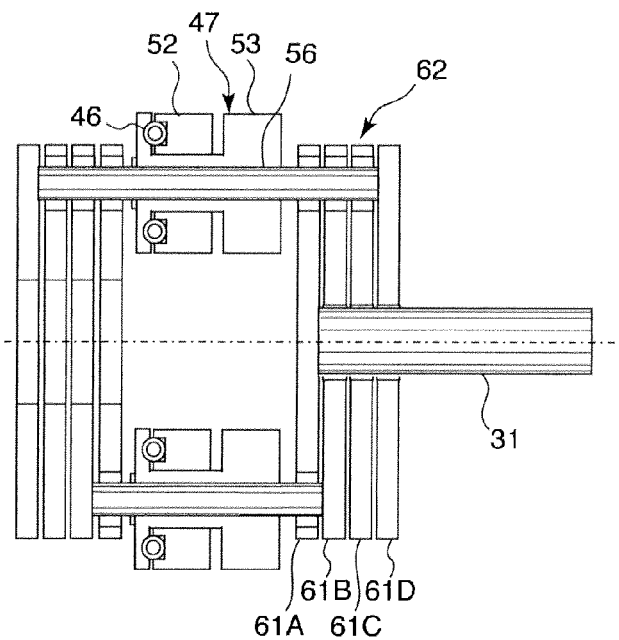
Figure 24C:
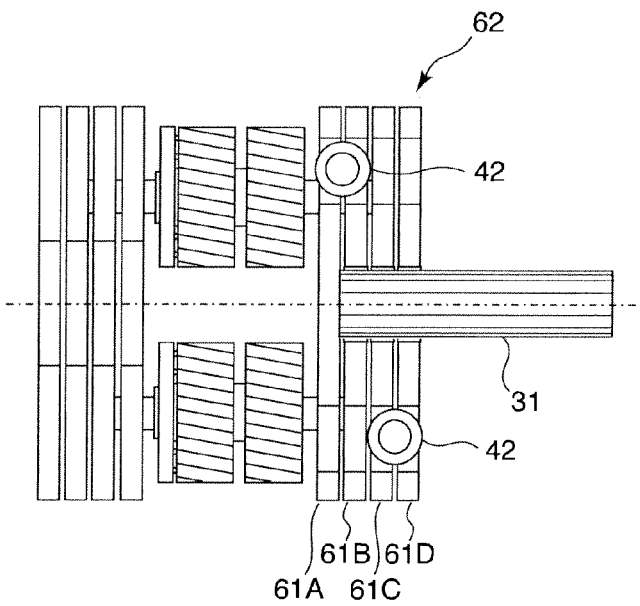

This embodiment is distinguishable from the fourth embodiment in that four planet gears 47, instead of the three planet gears 29, are utilized as shown in FIGS. 24A-24C. The planet gears 47 each include a first pinion 52 to interlock with the ring gear 25 and a second pinion 53 to interlock with the sun gear 27. The first pinion 52 and the second pinion 53 are coaxially supported by a common planet gear shaft 56. A pinion spacer spring 46 preloaded through advance compression, which elastically regulates relative rotation of the first pinion 52 and the second pinion 53, is disposed between the first pinion 52 and the second pinion 53.

The numbers of teeth at the first pinion 52 and the second pinion 53 are both set to 24. The number of teeth at the ring gear 25 is set to 72, whereas the number of teeth at the sun gear 27 is set to 24.

A planet carrier 62 that supports the four planet gears 47 includes planet gear shaft holding surfaces 61A-61D with a four-layer structure. The planet gear shaft holding surfaces 61A-61D each support a planet gear shaft 56 of one of the planet gears 47. The planet gear shaft holding surfaces 61A-61D are formed so that they are allowed to rotate relative to one another. A planet gear spacer spring 42 that is preloaded through advance compression is disposed between the first planet gear shaft holding surface 61A, which is linked with the output shaft 31 and the second planet gear shaft holding surface 61B located next to the first planet gear shaft holding surface 61A. A planet gear spacer spring 42 that is preloaded through advance compression is also disposed between the second planet gear shaft holding surface 61B and the third planet gear shaft holding surface 61C located next to the planet gear shaft holding surface 61B. A planet gear spacer spring 42 preloaded through advance compression is also disposed between the third planet gear shaft holding surface 61C and the fourth planet gear shaft holding surface 61D located next to the planet gear shaft holding surface 61C. No planet gear spacer spring 42 is disposed between the first planet gear shaft holding surface 61A and the fourth planet gear shaft holding surface 61D. In other words, three planet gear spacer springs 42 are disposed. These springs 42 constitutes an interlocking phase altering mechanism. The first planet gear shaft holding surface 61A is set so as to assume the innermost position among the four planet gear shaft holding surfaces 61A-61D.

Other structural features of the reduction gear 24 are identical to those of the fourth embodiment.

In the embodiment, the levels of the preloaded pressures at the springs 42 and 46 and the spring constants of the springs 42 and 46 are set in advance so that the deformation of the springs 42 and 46 starts when the torque output from the electric motor is at 100 Nm and further deformation of the springs 42 and 46 is restricted by the stoppers at 120 Nm.

In addition, when the springs 42 and 46, stopped by the stoppers, are at their maximum deformation, one planet gear shaft 56 is displaced by a ¼ pitch relative to the tooth pitch assumed at the sun gear 27, another planet gear shaft 56 is displaced by a 2/4 pitch relative to the tooth pitch assumed at the sun gear 27 and yet another planet gear shaft 56 is displaced by a ¾ pitch relative to the tooth pitch assumed at the sun gear 27. Through these displacements, a 90° offset is created among the four planet gears 47 with regard to the interlocking phases with which the sun gear 27 and the planet gears 47 interlock. In other words, interlocking phase differences of 0°, 90°, 180° and 270° are created, amounting to an interlocking phase difference total sum of 540°, which is a multiple obtained by multiplying 180° by 3. As in this embodiment, the interlocking phase difference total sum achieved in conjunction with a planetary gear mechanism equipped with an even number of planet gears will always be a multiple obtained by multiplying 180° by an odd number. For instance, interlocking phase differences that will manifest in conjunction with a planetary gear mechanism equipped with six planet gears will be 0°, 60°, 120°, 180°, 240° and 300°, with the interlocking phase difference total sum amounting to 900°, i.e., 5 times 180°. In addition, the interlocking phase difference manifested by any two successive planet gears will be an integral multiple of the value obtained by dividing 360° by the total number of planet gears.

The reduction gear 24 structured as described above is made to achieve a reduction ratio of 4:1, and the ring gear 25 and the sun gear 27 are both made to assume an interlocking order of 72 relative to the rotation of the output shaft 31. As in the fourth embodiment, the electric motor in the electric motor unit comprises a rotor with 18 poles and a stator with 57 slots, and the operating noise generated at the electric motor corresponds to the 18th order rotation of the electric motor and its higher harmonic component. The loudest operating noise corresponds to the 18th order motor rotation, i.e., the 72nd order output rotation resulting from the speed reduction, which matches the value representing the interlocking order (=72).

A method that may be adopted when setting the spring constants for the planet gear spacer springs 42 will be described next. Two successive planet gear shaft holding surfaces are displaced by a ¼ pitch relative to the tooth pitch assumed at the sun gear 27. The corresponding displacement angle is equal to $2\pi/288$ rad. Such a displacement occurs while the output torque from the electric motor increases by 20 Nm, i.e., while the torque at the output shaft 31 increases by 80 Nm. Since the four planet gear shafts 56 are each subjected to ¼ of the overall torque, the displacement of the individual planet gear shaft holding surfaces 61A-61D occurs while the torque at the output shaft 31 increases by 20 Nm.

Torques are applied to the planet gear spacer springs 42 disposed between the planet gear shaft holding surfaces 61A through 61D at varying levels. A torque corresponding to a single shaft is applied to the planet gear spacer spring 42 disposed between the fourth planet gear shaft holding surface 61D assuming the outermost position and the third planet gear shaft holding surface 61C. A torque corresponding to two shafts is applied to the planet gear spacer spring 42 disposed between the third planet gear shaft holding surface 61C, and the second planet gear shaft holding surface 61B. A torque corresponding to three shafts is applied to the planet gear spacer spring 42 disposed between the second planet gear shaft holding surface 61B and the first planet gear shaft holding surface 61A.

Torsional spring constants are thus set to 917 Nm/rad, 1833 Nm/rad and 2750 Nm/rad for the individual planet gear spacer springs 42.

Initial displacements applied to the planet gear spacer springs 42 as the preloaded pressures in order to ensure that the planet gear spacer springs 42 do not start displacement until the output torque from the electric motor reaches 100 Nm are 0.11 rad both for both the inner and outer springs.

Figure 25A:
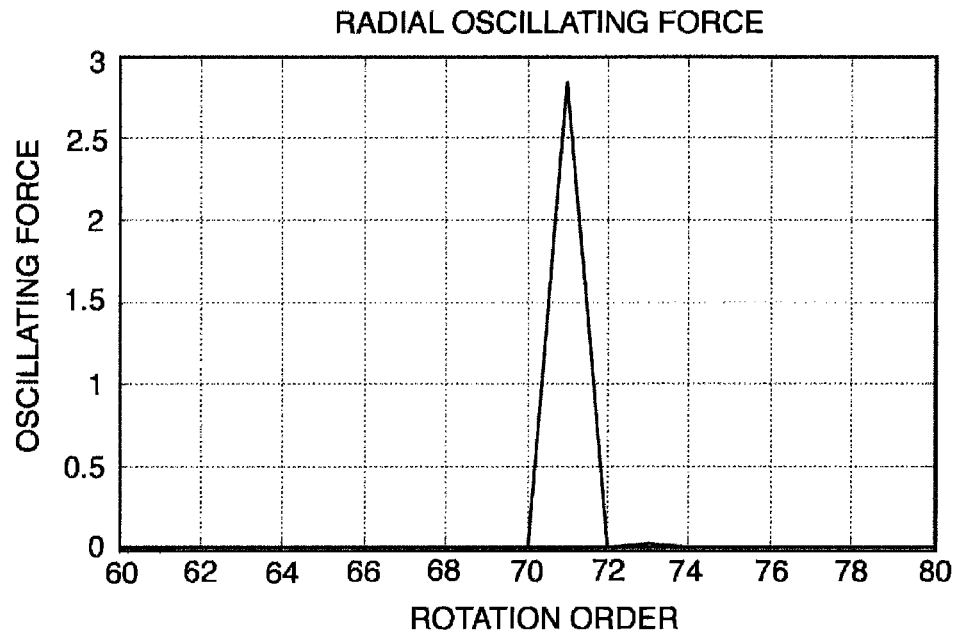
FIGS. 25A and 25B are diagrams showing a relationship among the order of rotation of the reduction gear, the oscillating force and the phase difference, brought fourth by the interlocking phase altering mechanism according to the fifth embodiment of this invention.

When the electric motor accelerates with an output torque equal to or greater than 120 Nm at the settings selected as described above, the reduction gear 24 generates an operating noise of the 71st order, an order smaller by one order relative to the interlocking order of the ring gear 25, as shown in FIG. 25A, due to the radial forces, which tend to generate noise more readily. As this operating noise is combined with the operating noise of the 72nd order generated at the electric motor, the beat noise is created.

Figure 25B:
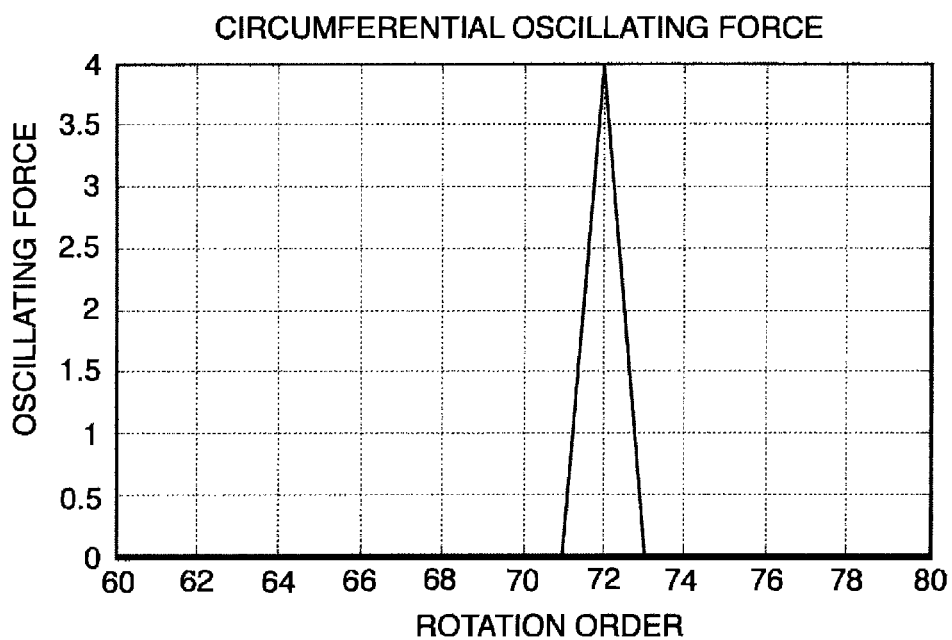

When the electric motor is driven with a low torque equal to or less than 100 Nm, as in a steady traveling state, an operating noise of the 72nd order, i.e., an operating noise at a lower level, is generated at the reduction gear 24 due to the rotational forces, which do not induce noise readily, as indicated in FIG. 25B. The order of the operating noise at the reduction gear 24 matches the order of the operating noise at the electric motor and thus, no beat noise is created.

Referring to FIGS. 26A and 26B, FIG. 27 and FIGS. 28A and 28B, a sixth embodiment of this invention will be described.

This embodiment is achieved by modifying the structures of the reduction gear 24 and the interlocking phase altering mechanism in the fourth embodiment. Other structural features are identical to those of the fourth embodiment.

Referring to FIGS. 26A and 26B, the numbers of teeth at the ring gear 25 and the sun gear 27 in the planetary gear mechanism are respectively set to 72 and 24 in the reduction gear 24 in the embodiment.

The planetary gear mechanism includes four planet gears 47 and a planet carrier 48. The planet gears 47, similar to those in the fifth embodiment, each include a first pinion 52 to interlock with the ring gear 25, a second pinion 53 to interlock with the sun gear 27 and a pinion spacer spring 46. The numbers of teeth at the first pinion 52 and the second pinion 53 are both set to 24. The reduction gear 24 structured as described above is made to achieve a reduction ratio of 4, and the ring gear 25 and the sun gear 27 are both made to assume an interlocking order of 72 relative to the rotation of the output shaft 31.

As in the fourth embodiment, the electric motor comprises a rotor with 18 poles and a stator with 57 slots, and the operating noise generated at the electric motor corresponds to the 18th order rotation of the electric motor and its higher harmonic component. The 18th order electric motor rotation is equivalent to the 72nd order output rotation resulting from the speed reduction, which matches the value representing the interlocking order of 72 with which the ring gear 25 and the sun gear 27 interlock, as described earlier.

The planet carrier 30 includes planet gear shaft holding surfaces 49A and 49B with a two-layer structure. The planet gear shaft holding surfaces 49A and 49B each support a planet gear shaft 56 of one of the two consecutive planet gears 47. The two planet gear shaft holding surfaces 49A and 49B are formed so that they are allowed to rotate relative to each other. A pair of planet gear spacer springs 42 preloaded through advance compression are disposed between the two planet gear shaft holding surfaces 49A and 49B. The planet gears 47, the planet carrier 48 and the planet gear spacer springs 42 constitute an interlocking phase altering mechanism in the embodiment. The inner planet gear shaft holding surface 49A is linked with the output shaft 31.

The first pinion 52 and the second pinion 53 constituting each planet gear 47 are coaxially supported so as to allow them to rotate relative to each other with the pinion spacer spring 46 preloaded through advance compression disposed between the first pinion 52 and the second pinion 53.

As an output torque originating from the electric motor is input to the reduction gear 24, a torque transmission force is applied to the pair of planet gear spacer springs 42. As long as the level of this force does not exceed the preloaded pressure, the planet gear spacer springs 42 are not deformed. However, once the force exceeds the preloaded pressure, the planet gear spacer springs 42 become deformed. As the transmitted torque increases and the extent of the deformation of the planet gear spacer springs 42 becomes more significant, the planet gear shafts 56 come into contact with stoppers and thus any further deformation of the planet gear spacer springs 42 is disallowed. Similar deformation occurs at the pinion spacer springs 46 disposed between the first pinions 52 and the second pinions 53. The levels of the preloaded pressures at the springs 42 and the springs 46 and the spring constants of the springs 42 and the springs 46 are set in advance so that the springs 42 and the springs 46 start to deform at substantially the same level of transmitted torque and the planet gear shafts 56 come into contact with the stoppers at substantially the same level of transmitted torque.

Figure 27:
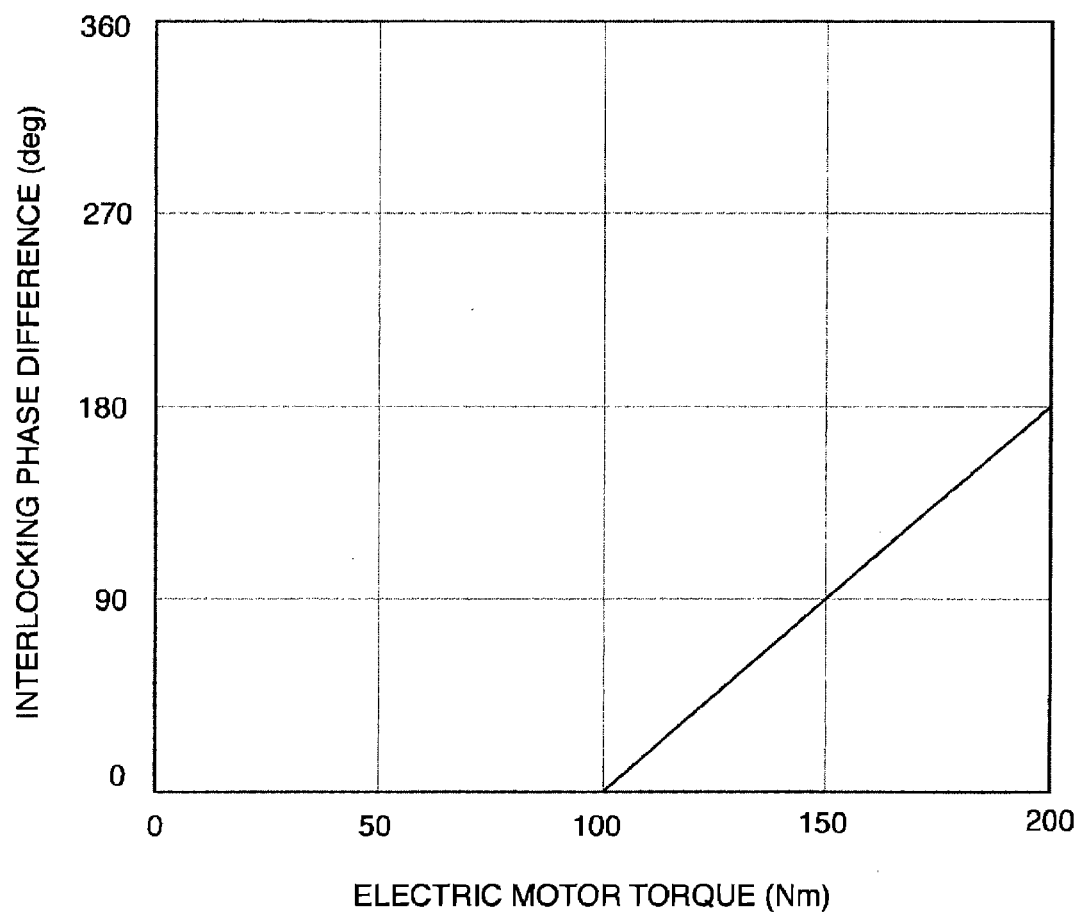
FIG. 27 is a diagram indicating a planet gear interlocking phase difference created by the interlocking phase altering mechanism according to the sixth embodiment of this invention.

Referring to FIG. 27, the levels of the preloaded pressures at the springs 42 and 46 and the spring constants of the springs 42 and 46 are set in advance so that the deformation of the springs 42 and 46 starts when the drive torque from the electric motor is at 100 Nm and further deformation is restricted by the stoppers at 200 Nm, i.e., the maximum output torque of the electric motor. In addition, when the springs 42 and 46, stopped by the stoppers, are at their maximum deformation, the planet gear shafts 56 are displaced by a ½ pitch relative to the tooth pitch assumed at the ring gear 25. Through this displacement, a 180° offset is created with regard to the interlocking phase with which the ring gear 25 and the planet gears 47 interlock.

A method that may be adopted when setting the spring constants for the pair of planet gear spacer springs 42 disposed between the planet gear shaft holding surface 49A and the planet gear shaft holding surface 49B will be described next. The planet gear shaft holding surfaces 49A and 49B are displaced by a ½ pitch relative to the tooth pitch assumed at the ring gear 25 with a displacement angle equal to $2\pi/144$ rad. Such a displacement occurs while the output torque from the electric motor increases by 100 Nm, i.e., while the output torque at the output shaft 31 increases by 400 Nm. Since a torque equivalent to a ¼ of the overall torque is transmitted to each of the four planet gear shafts 56, the torque applied a given planet gear shaft holding surface 49A (or 49B) holding two planet gear shafts 56 will be 200 Nm. For this reason, a torsional spring constant of 4584 Nm/rad is set for a torsional spring constant for the outer planet gear spacer springs 42. An initial displacement applied to the springs 42 as the preloaded pressure in order to ensure that the planet gear spacer springs 42 do not start displacement until the output torque from the electric motor reaches 100 Nm is 0.044 rad.

When the electric motor accelerates with the maximum torque of 200 Nm with the settings selected as described above, induce only radial forces, which tend to readily create noise, will be imparted at the reduction gear 24. As a result, noise corresponding to a 72±1st order rotation, with the order deviating by ±1 from the interlocking order with which the sun gear 27 interlocks, will occur, and beat noise will be generated as this noise is combined with the operating noise of the electric motor corresponding to the 72nd order rotation.

Figure 28A:
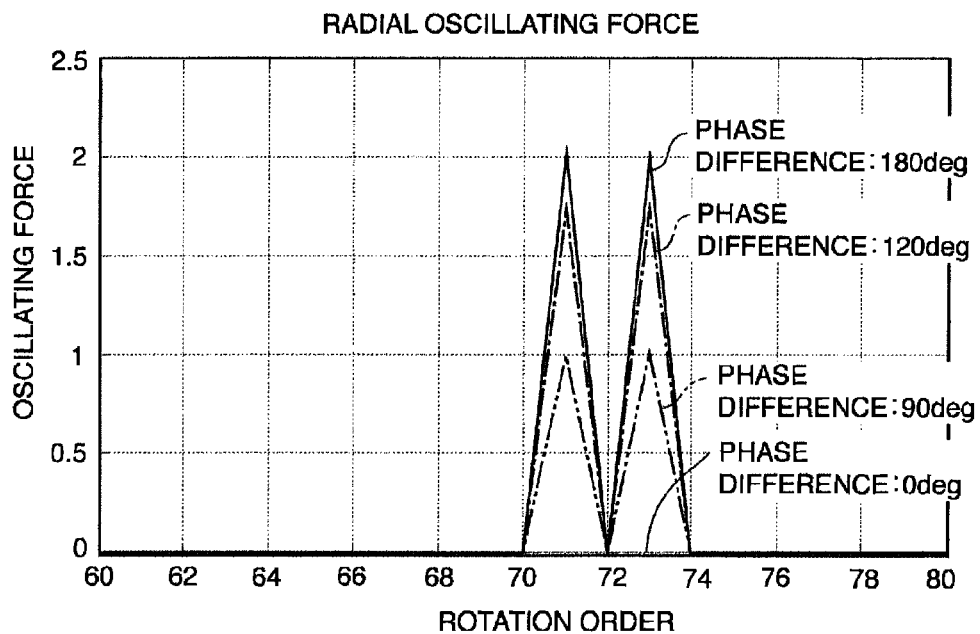
FIGS. 28A and 28B are diagrams showing a relationship among the order of rotation of the reduction gear, the oscillating force and the phase difference, brought fourth by the interlocking phase altering mechanism according to the sixth embodiment of this invention.
Figure 28B:
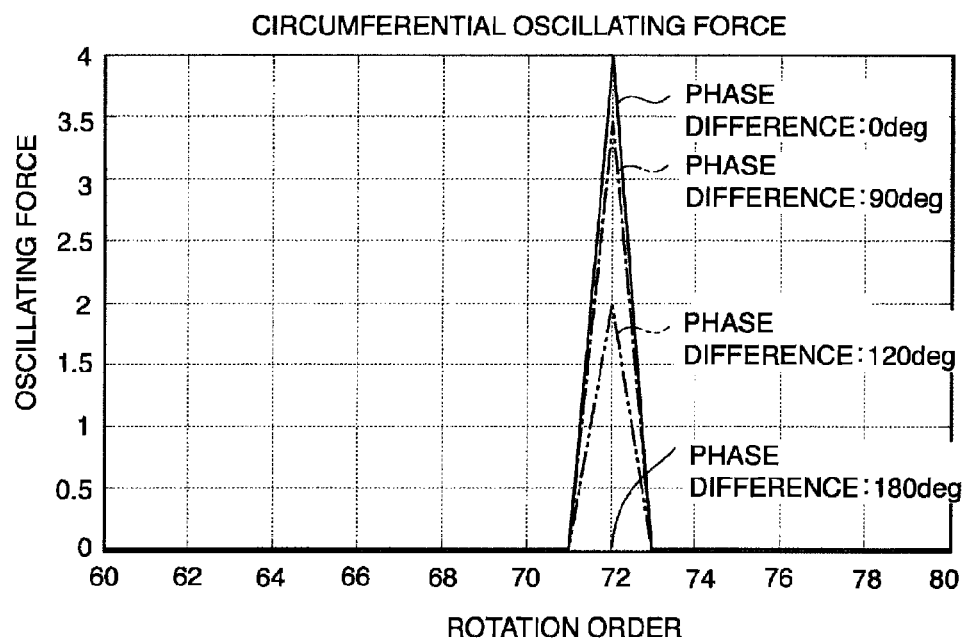

However, when the output torque from the electric motor is equal to or less than 100 Nm, as in a steady traveling state, an operating noise corresponding to the 72nd order rotation at a lower level, is generated at the reduction gear 24 due to the rotational forces, which do not induce noise readily, as indicated in FIG. 28B. The order of the operating noise at the reduction gear 24 matches the order of the operating noise at the electric motor and thus, no beat noise is created.

In a torque range between 100 Nm and 200 Nm, the interlocking phase difference increases as the output torque from the electric motor increases and, as a result, radial forces corresponding to the 72±1st order rotation will increase, as indicated in FIG. 28A. The rotational forces corresponding to the 72nd order rotation, however, will decrease, as indicated in FIG. 28B. As a result, the beat fluctuation amplitude of the beat noise generated by combining the reduction gear noise corresponding to the 72±1st order rotation and the electric motor noise corresponding to the 72nd order rotation will increase in proportion to the increase in the output torque from the electric motor, so as to intensify the effect of the beat as the electric motor continues to accelerate.

Through this embodiment, beat noise reflecting the level of acceleration can be created in an accelerating vehicle by utilizing an interlocking phase altering mechanism assuming a simpler structure with fewer components compared to that in the fourth embodiment. Consequently, an improved, emotionally satisfying, electric vehicle accelerating noise can be created.

Although the invention has been described above with reference to certain embodiments, the invention is not limited to the embodiments described above. Modifications and variations of the embodiments described above will occur to those skilled in the art, within the scope of the claims.

For example, while this invention has been described in reference to embodiments in which the invention is adopted in an electric vehicle that stores electric power, supplied from an external source, in a battery, the invention may be adopted equally effectively in, for instance, a hybrid-drive electric vehicle with an onboard power generator.

INDUSTRIAL APPLICABILITY

As described above, this invention achieves a desired improvement with respect to operating noise occurring as an electric motor, utilized as a motive force source of a vehicle, accelerates.

The embodiments of this invention in which an exclusive property or privilege is claimed are defined as follows:

1. An operating noise control device for a vehicle, the vehicle comprising a motive power source that generates an operating noise in proportion to a rotation speed thereof, the device comprising:
   a heat noise generation system that creates beat noise by generating a second operating noise with a component an order of which is close to a value representing an order of the operating noise generated by the motive power source while the vehicle accelerates.

2. The operating noise control device as defined in claim 1, wherein the motive power source is an electric motor.

3. The operating noise control device as defined in claim 2, wherein the beat noise generation system is configured to generate the second operating noise only when the vehicle accelerates.

4. The operating noise control device as defined in claim 2, wherein the beat noise generation system is configured to stop generation of the second operating noise when the rotation speed of the electric motor becomes equal to or higher than a first predetermined speed.

5. The operating noise control device as defined in claim 4, wherein the beat noise generation system is configured to increase an amplitude of the second operating noise while the rotation speed of the electric motor rises from 0 rpm to a second predetermined speed lower than the first predetermined speed.

6. The operating noise control device as defined in claim 5, wherein the second predetermined speed corresponds to a resonance frequency of a back-and-fourth vibration of a vehicle body.

7. The operating noise control device as defined in claim 2, wherein the electric motor is a synchronous alternating current electric motor, and the beat noise generation system comprises an inverter that provides a drive current to the alternating current electric motor and a controller that controls the drive current.

8. The operating noise control device as defined in claim 7, wherein the controller is programmed to calculate a current instruction value representing a sum of the drive current and a higher-order component current, an order of which is equivalent to either one more or one less than an order determined by adding a value with an absolute value smaller than 1 to an order of a frequency of an operating noise of the electric motor relative to a drive current frequency and to generate the second operating noise by outputting a current from the inverter based upon the current instruction value.

9. The operating noise control device as defined in claim 7, wherein the controller is programmed to calculate a correction coefficient that assumes an order determined by adding a value with an absolute value smaller than 1 to an order of a frequency of an operating noise of the electric motor relative to a drive current frequency and also achieves a time average of 1, to calculate a current instruction value by multiplying a basic current by the correction coefficient and to generate the second operating noise by outputting a current from the inverter based upon the current instruction value.

10. The operating noise control device as defined in claim 9, wherein the beat noise generation system further comprises an external operation panel via which a driver of the vehicle inputs instructions for generating the second operating noise and for stopping generation of the second operating noise; and the controller is further programmed to generate or stop generating the second operating noise in response to an instruction received via the external operation panel.

11. The operating noise control device as defined in claim 9, wherein the beat noise generation system further comprises:

an external operation panel via which a driver of the vehicle sets a frequency and strength of the beat noise created by generating the second operating noise; and the controller is further programmed to set the correction coefficient based upon the frequency and the strength set for the beat noise via the external operation panel.

12. The operating noise control device as defined in claim 2, wherein the electric motor is a synchronous alternating current electric motor, and the beat noise generation system comprises a reduction gear that transmits rotation of a synchronous alternating current electric motor to a wheel of the vehicle at a rotation speed reduced by causing a plurality of gears to interlock; and the reduction gear alters an interlocking phase with which the plurality of gears interlock so as to generate the second operating noise containing a component, the order of which is close to an order of an operating noise in proportion to the rotation speed of the electric motor.

13. The operating noise control device as defined in claim 12, wherein the reduction gear comprises a planetary gear mechanism that comprises a sun gear, a ring gear, a plurality of planet gears each interlocking with both the sun gear and the ring gear and a planet carrier that rotatably supports each of the planet gears over intervals set along a circumferential direction; and an interlocking phase altering mechanism is configured to alter relative positions assumed by the plurality of planet gears along the circumferential direction in correspondence to a torque transmitted to the plurality of planet gears.

14. The operating noise control device as defined in claim 13, wherein the interlocking phase altering mechanism is configured to alter the relative positions assumed by the plurality of planet gears along the circumferential direction by creating an interlocking phase difference among the plurality of planet gears with regard to the interlocking phases at which the planet gears interlock with either the sun gear or the ring gear.

15. The operating noise control device as defined in claim 14, wherein the planet gears each comprise two pinions formed coaxially and a pinion spacer spring that alters relative rotations of the two pinions in correspondence to a torque transmitted between the pinions; and the interlocking phase altering mechanism comprises a planet gear spacer spring that alters the relative positions assumed by the plurality of planet gears along the circumferential direction in correspondence to the torque transmitted to the plurality of planet gears.

16. The operating noise control device as defined in claim 15, wherein the planet gear spacer spring is preloaded so that the relative positions assumed by the plurality of planet gears along the circumferential direction are not altered until the torque transmitted to the plurality of planet gears exceeds a first predetermined torque.

17. The operating noise control device as defined in claim 16, wherein characteristics of the planet gear spacer spring are set so that a total sum of interlocking phase differences created among the plurality of planet gears when the torque transmitted to the plurality of planet gears becomes equal to a second predetermined torque greater than the first torque matches a predetermined angle.

18. The operating noise control device as defined in claim 17, the planetary gear mechanism comprises an odd number of planet gears, wherein the predetermined angle is an integral multiple of 360° and an interlocking phase difference created between successive planet gears takes a value obtained by multiplying a value that is an integral multiple of a quotient obtained by dividing 360° by the number of planet gears.

19. The operating noise control device as defined in claim 17, the planetary gear mechanism comprises an even number of planet gears, wherein the predetermined angle assumes a value obtained by multiplying 180° by an odd number and an interlocking phase difference created between successive planet gears takes a value that is an integral multiple of quotient obtained by 360° by the number of planet gears.

20. The operating noise control device as defined in claim 16, the planetary gear mechanism comprises an even number of planet gears, wherein an interlocking phase difference, created between planet gears that face opposite to each other when the torque transmitted to the plurality of planet gears reaches a second predetermined torque greater than the first torque, is equal to 180©.

21. The operating noise control device as defined in claim 15, wherein the planet carrier comprises a plurality of planet gear shaft holding surfaces that individually support the plurality of planet gears layered along an axial direction in a state in which the planet gear shaft holding surfaces are allowed to become displaced relative to one another along the circumferential direction; and the planet gear spacer spring is disposed between a specific planet gear shaft holding surface and another planet gear shaft holding surface.

22. The operating noise control device as defined in claim 13, wherein the planetary gear mechanism comprises an even number of planet gears; and the interlocking phase altering mechanism is configured to achieve, among the planet gears facing opposite to each other, a state where an interlocking phase difference between the planet gears and another gear exists, and a state where an interlocking phase difference between the planet gears and another gear does not exist, depending on the relative positions assumed by the plurality of planet gears along the circumferential direction.

23. An operating noise control method for a vehicle, the vehicle comprising a motive power source that generates an operating noise in proportion to a rotation speed thereof, the method comprising:

creating beat noise by generating a second operating noise with a component an order of which is close to a value representing an order of the operating noise generated by the motive power source while the vehicle accelerates.

\* \* \* \* \*